US009523498B2

(12) United States Patent
Zimmer et al.

(10) Patent No.: US 9,523,498 B2
(45) Date of Patent: Dec. 20, 2016

(54) HEATER FOR LIQUEFIED PETROLEUM GAS STORAGE TANK

(71) Applicant: Algas-SDI International LLC, Seattle, WA (US)

(72) Inventors: George M. Zimmer, Kent, WA (US); Jeffrey R. Ervin, Bellevue, WA (US); Michael J. Kirby, Kent, WA (US)

(73) Assignee: Algas-SDI International LLC, Seattle, WA (US)

( * ) Notice: Subject to any disclaimer, the term of this patent is extended or adjusted under 35 U.S.C. 154(b) by 0 days.

(21) Appl. No.: 14/604,547

(22) Filed: Jan. 23, 2015

(65) Prior Publication Data

US 2015/0260394 A1 Sep. 17, 2015

Related U.S. Application Data

(63) Continuation of application No. 13/162,363, filed on Jun. 16, 2011, now Pat. No. 8,951,041.

(Continued)

(51) Int. Cl.
*F23N 5/00* (2006.01)
*F23C 13/02* (2006.01)

(Continued)

(52) U.S. Cl.
CPC ................. *F23C 13/02* (2013.01); *F17C 7/04* (2013.01); *F17C 13/025* (2013.01);

(Continued)

(58) Field of Classification Search
CPC .......... F17C 7/04; F24H 1/0045; F24H 1/185; F24H 9/1818

(Continued)

(56) References Cited

U.S. PATENT DOCUMENTS 1,948,298 A 2/1934 Howard
2,463,477 A 3/1949 Buttner (Continued)

FOREIGN PATENT DOCUMENTS

CA 2659677 9/2010
JP 06174233 A * 6/1994

(Continued)

OTHER PUBLICATIONS

Two page sales flyer from Leo's Service (a Canadian company), advertising "The Leo Propane Pressure Recovery System." Obtained on or about Jun. 23, 2010. Date of first printing unknown.

*Primary Examiner* — Steven B McAllister
*Assistant Examiner* — Ko-Wei Lin
(74) *Attorney, Agent, or Firm* — Seed IP Law Group LLP

(57) ABSTRACT

A catalytic tank heater includes a catalytic heating element supported on an LPG tank by a support structure that holds the element in a position facing the tank. Vapor from the tank is provided as fuel to the heating element, and is regulated to increase heat output as tank pressure drops. The heating element is internally separated into a pilot heater and a main heater, with respective separate fuel inlets. The pilot heater remains in continual operation, but the main heater is operated only while tank pressure is below a threshold. Operation of the pilot heater keeps a portion of the catalyst hot, so that, when tank pressure drops below the threshold, and fuel is supplied to the main heater, catalytic combustion quickly expands from the area surrounding the pilot heater to the remainder of the catalyst.

27 Claims, 15 Drawing Sheets

Related U.S. Application Data

(60) Provisional application No. 61/355,463, filed on Jun. 16, 2010.

(51) Int. Cl.
*F17C 7/04* (2006.01)
*F17C 13/02* (2006.01)

(52) U.S. Cl.
CPC *F17C 2201/0109* (2013.01); *F17C 2201/035* (2013.01); *F17C 2201/054* (2013.01); *F17C 2205/018* (2013.01); *F17C 2221/033* (2013.01); *F17C 2221/035* (2013.01); *F17C 2223/0153* (2013.01); *F17C 2223/0161* (2013.01); *F17C 2225/0123* (2013.01); *F17C 2227/0107* (2013.01); *F17C 2227/0306* (2013.01); *F17C 2227/0386* (2013.01)

(58) Field of Classification Search
USPC .... 126/401, 226, 231, 116 A; 431/268, 147, 431/6, 42, 43, 49, 267, 28
See application file for complete search history.

(56) References Cited

U.S. PATENT DOCUMENTS

| | | | | |
|---|---|---|---|---|
| 2,564,863 | A * | 8/1951 | Strobel | F23N 5/065 236/101 E |
| 3,253,641 | A | 5/1966 | Gutzeit | |
| 3,796,207 | A | 3/1974 | Olson | |
| 4,833,299 | A | 5/1989 | Estes | |
| 5,569,020 | A * | 10/1996 | Griffin | F23C 13/08 431/284 |
| 5,878,739 | A * | 3/1999 | Guidry | A47J 37/0704 126/25 A |
| 6,119,598 | A | 9/2000 | Reynolds et al. | |
| 6,293,471 | B1 | 9/2001 | Stettin et al. | |
| 6,516,754 | B2 | 2/2003 | Chadwick | |
| 7,066,729 | B1 | 6/2006 | Rajewski | |
| 7,238,020 | B2 | 7/2007 | Yang et al. | |
| 7,248,791 | B2 * | 7/2007 | Toth | F17C 9/02 222/3 |
| 7,319,814 | B2 | 1/2008 | Luo | |
| 7,410,619 | B2 * | 8/2008 | Reiser | F23C 13/00 422/105 |
| 2002/0124575 | A1 | 9/2002 | Pant et al. | |
| 2006/0076716 | A1 | 4/2006 | Hysky et al. | |
| 2009/0078247 | A1 | 3/2009 | Sun | |
| 2011/0132203 | A1 | 6/2011 | Tippmann, Sr. | |

FOREIGN PATENT DOCUMENTS

| | | | |
|---|---|---|---|
| JP | 2002181293 | A * | 6/2002 |
| JP | 2002340294 | A | 11/2002 |
| JP | 2004257642 | A | 9/2004 |
| JP | 2004360878 | A | 12/2004 |
| WO | 2009003481 | A2 | 1/2009 |

* cited by examiner

HEATER FOR LIQUEFIED PETROLEUM GAS STORAGE TANK

CROSS-REFERENCE TO RELATED APPLICATION

This application is a continuation of U.S. patent application Ser. No. 13/162,363, filed Jun. 16, 2011 which claims the benefit of U.S. Provisional Patent Application No. 61/355,463, filed Jun. 16, 2010, which applications are incorporated herein by reference in their entirety.

BACKGROUND OF THE INVENTION

Technical Field

Embodiments described in the present disclosure are directed generally to catalytic heaters and heaters for warming storage tanks containing fluids that are normally gaseous at normal atmospheric pressure and typical ambient temperatures, and in particular to catalytic heaters configured to be coupled to such storage tanks, and including pilot heaters to enable rapid activation of the heaters.

Description of the Related Art

A number of fluids that are normally found in gaseous form are commonly stored and transported under pressure as liquids, including, for example, methane, butane, propane, butadiene, propylene, and anhydrous ammonia. Additionally, fuel gasses comprising one or more constituent gasses are also stored and transported under pressure as liquids, including, e.g., liquefied petroleum gas (LPG), liquefied natural gas (LNG), and substitute natural gas (SNG). Of these, LPG is perhaps the most commonly used. Accordingly, the discussion that follows, and the embodiments described, refer specifically to LPG. Nevertheless, it will be understood that the principles disclosed with reference to embodiments for use with LPG tanks can be similarly applied to tanks in which other liquefied gases are stored or transported, and are within the scope of the invention.

LPG is widely used for heating, cooking, agricultural applications, and air conditioning, especially in locations that do not have natural gas hookups available. In some remote locations, LPG is even used to power generators for electricity. LPG is typically held in pressurized tanks that are located outdoors and above ground. Under one atmosphere of pressure, the saturation temperature of LPG, i.e., the temperature at which it boils, is around −40° C. As pressure increases, so too does the saturation temperature. LPG is held in a liquid state by gas pressure inside the tank. As gas vapor is drawn off from the tank for use, the pressure in the tank drops, allowing more of the liquefied gas to boil to vapor, which increases or maintains pressure in the tank.

As the gas boils, the phase change from liquid to gas draws thermal energy from the remaining liquid, which tends to reduce the temperature of the LPG in the tank. If LPG temperature drops, the boiling slows or stops, as the LPG temperature approaches the saturation temperature. Thus, boiling LPG tends to increase pressure and saturation temperature, while at the same time tending to decrease the actual temperature of the LPG in the tank, until an equilibrium temperature is reached, at which the saturation temperature is equal to the current temperature of the LPG. Provided the energy expended to vaporize the gas does not exceed the thermal energy absorbed by the tank externally, from, for example, sunlight and the surrounding air, the LPG will continue to boil as vapor is drawn off, until the tank is empty. On the other hand, if more energy is expended to vaporize the gas than is replaced by external sources, the temperature in the tank will drop toward the equilibrium temperature, resulting in less energetic boiling, and a drop in tank pressure. If tank pressure drops too low, it can interfere with the operation of appliances and equipment that draw gas for use, such as furnaces, ovens, ranges, etc.

For purposes of the following disclosure, the maximum continuous rate at which gas can flow from a supply tank using only ambient energy to vaporize the LPG, without causing the tank pressure to drop below an acceptable level, will be referred to as the maximum unassisted flow rate. It will be recognized that this rate will vary according to the ambient temperature near the tank.

Low tank pressure is a particular concern in regions where ambient temperature can drop to very low levels, such as during the winter at high latitudes, or at very high altitudes. For example, when ambient temperature drops very low, the heat energy available to warm an LPG storage tank is reduced, while at the same time, the cold temperature prompts an increased draw of gas to fuel furnaces to warm homes and other buildings. As gas pressure drops below the regulated pressure of the gas line, flames in furnaces, water heaters, and other gas consuming appliances reduce in size, producing less heat and prompting users to open gas valves further, which only accelerates the pressure drop. Eventually, tank temperature can drop below the boiling point of unpressurized gas, at which point, no gas will flow. It can be seen that, as ambient temperature drops, the potential for unacceptable loss of pressure increases, as does the potential demand for gas, for heating.

To prevent such a pressure reduction, there are a number of measures that can be taken, which fall into three general categories, each with its own advantages and disadvantages.

In the first category, LPG is drawn from the bottom of a tank as a liquid, and passed through a separate vaporizer in the supply line, to meet demand. The volume of liquid flow has relatively little effect on tank—or system—pressure, because the liquid in the tank boils only to the extent necessary to replace the volume of fluid drawn from the tank. Thus, the limiting factor is more frequently the capacity of the vaporizer. In some limited situations, where, for example, the ambient temperature is very low, and the draw by the load is very high, tank pressure can still drop. In such cases, a vapor return line is frequently employed from the outlet of the vaporizer to the tank to increase the tank pressure.

There are a number of types of LPG vaporizers, including direct gas-fired and electrically heated. Some electric vaporizers with explosion-proof electrical connections can be mounted on or near the storage tank. However, safety regulations in most jurisdictions require that sources of combustion, such as an open flame, or heat sources that exceed the auto-ignition temperature of LPG, cannot be located in a same enclosure with an LPG storage tank, or within some minimum distance. Thus, a gas fired vaporizer must be positioned away from the storage tank, which adds cost and complexity, and increases maintenance requirements. Nevertheless, gas-fired vaporizers are more commonly used with large LPG storage systems, because the heating cost is generally lower than with electrically heated vaporizers. Additionally, gas-fired units can be used in locations where electricity is unavailable. A disadvantage of in-line vaporizers in general is that because they draw liquid from the bottom of the tank, they are always in operation, even when the maximum unassisted flow rate exceeds the current vapor demand.

In a second system configuration, gas for normal use is drawn from the top of the tank, but when pressure drops below a threshold, liquid is drawn from the bottom and boiled to vapor in a vaporizer and returned to the top of the tank to re-pressurize the tank. On one hand, such systems have more complex control, plumbing, vapor, and fluid circuits. On the other hand, these systems employ the vaporizer only when tank pressure drops below the threshold, so they tend to be more fuel efficient than in-line vaporizer systems.

In a third configuration, a tank heater is activated to warm the tank and its contents when tank temperature or pressure drops below a threshold. One type of tank heater comprises an electric element strapped to the tank. In another type, indirect heat is used, in which a medium, such as water or steam, is heated at a remote location, then piped to a heat exchanger in contact with the tank walls. Indirect heat is advantageous in situations where waste heat is available, such as where water is used to cool industrial machinery, etc.

Generally, disadvantages of many of the systems available are often related to the difficulty of providing heat in the close vicinity of an LPG tank without creating a condition that would be dangerous in the event of a tank leak or tank over-pressure. The complexity of systems in which a heat source is remotely located not only increases the cost, but also the likelihood of malfunction. Additionally, vaporizers and heaters that employ electric heating elements, or that are electrically controlled, are impractical for use in applications where electrical power is not available. In such cases, an electric generator is required to provide the electricity, resulting in costly efficiency losses.

One problem associated with electric tank heaters, in particular, is that the heating element is in direct contact with the tank wall. Temperature differentials between the element and the tank can promote water condensation, which can be trapped between the heating element and the surface of the tank, resulting in deterioration of the paint and subsequent corrosion of the steel tank wall.

Most jurisdictions have stringent regulations regarding the use of combustion sources near LPG tanks and gas transmission lines. These regulations dictate explosion-proof requirements for electrical connections, minimum distances to open flames, etc. The restrictions vary according to the size of a tank and proximity to public areas.

BRIEF SUMMARY

According to an embodiment, a catalytic heater system includes a catalytic heating element supported on an LPG storage tank by a support structure that holds the element in a position facing the tank. When a load draws sufficient vapor to cause the tank to self refrigerate and lose pressure, the catalytic heating element is operated to warm the tank and restore pressure. Vapor from the tank is provided as fuel to the heating element, and can be regulated to increase heat output as tank pressure drops.

According to an embodiment, the catalytic heating element is internally separated into a pilot heater and a main heater, with respective separate fuel inlets. In use, the pilot heater remains in continual operation, but the main heater is operated only as required. Operation of the pilot heater keeps a portion of the catalyst hot, so that, when fuel is supplied to the main heater, catalytic combustion quickly expands from the area surrounding the pilot heater to the remainder of the catalyst in the main heater.

According to an embodiment, a catalytic heating system is provided, including a catalytic heating element separated into a pilot heater and a main heater, with respective separate fuel inlets. A pressure regulator controls fuel flow to the main heater, and a shut-off valve controls fuel to both the pilot and main heaters. A heat sensor positioned in or near the pilot heater operates to hold the shut-off valve open. If the pilot heater stops producing heat, the shut-off valve closes, terminating all fuel flow to the heating element. Where this catalytic heating system is employed to warm an LPG storage tank, a control terminal of the pressure regulator is coupled to a direct tank pressure feedback line, and configured to control fuel flow to the main heater in inverse relation to the tank pressure. If tank pressure drops below a threshold, the regulator permits fuel to flow to the main heater, and as tank pressure drops further, the flow increases, to produce more heat. One or more temperature sensors positioned on the tank wall near the heating element detect reduced levels of liquid in the tank, and signal a fuel interrupt to the main heater or to the main and pilot heaters, according to the embodiment and specific conditions.

According to an embodiment, a catalytic heating element is coupled to a mounting structure configured to be coupled to a cylindrical tank, and to support the heating element facing the tank wall. The mounting structure includes a shroud that extends around at least a portion of the heating element and that conforms, on one side, to the contour of the cylindrical tank. The shroud can be in the form of a cabinet that substantially encloses the heating element against the tank wall, or can be an extension of a housing of the heating element. The shroud can also be configured to enclose heater controls as provided in other embodiments.

DETAILED DESCRIPTION

Figure 1:
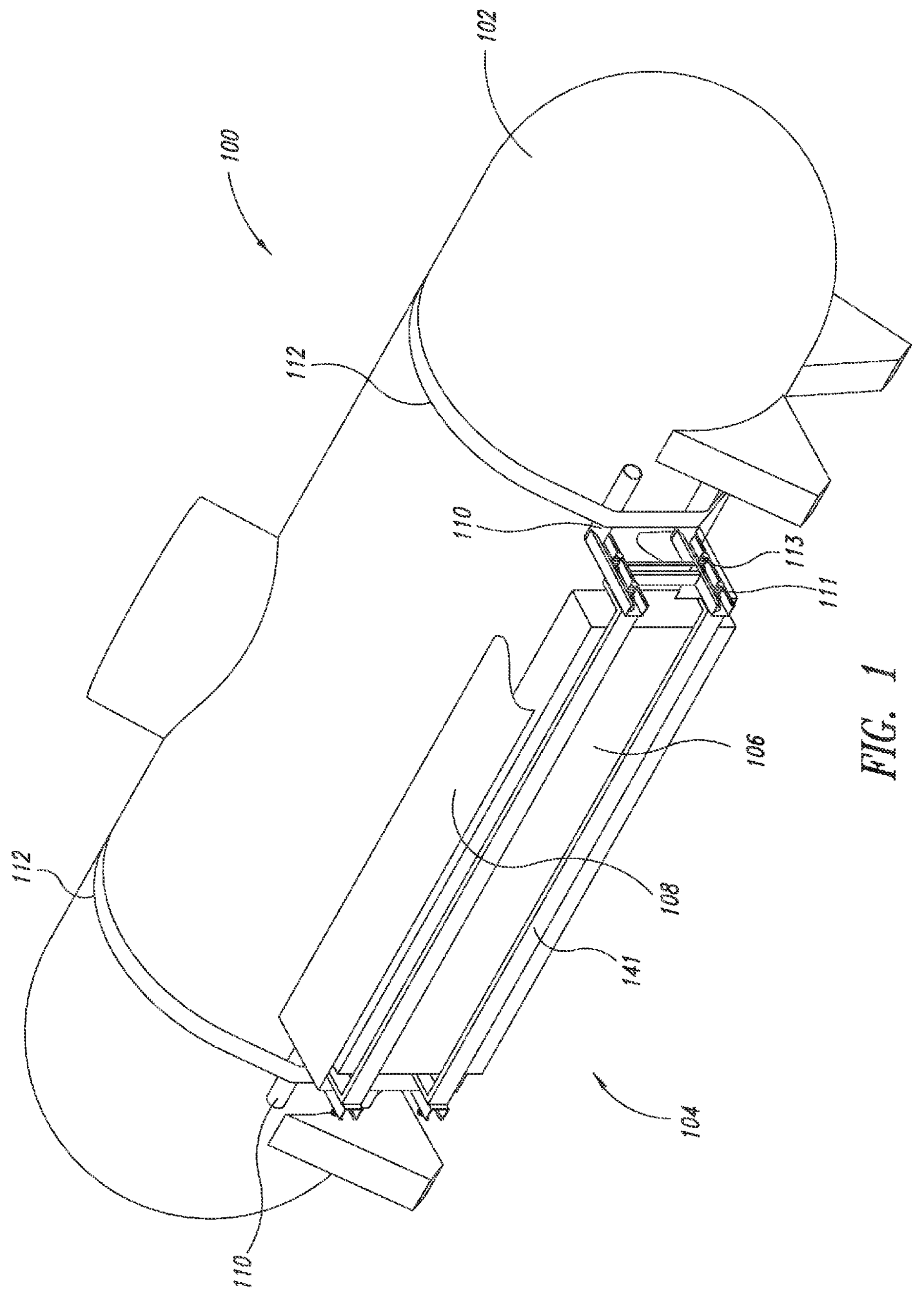
FIG. 1 is a perspective view of an LPG storage system according to an embodiment, including an LPG storage tank and a tank heater system.
Figure 2:
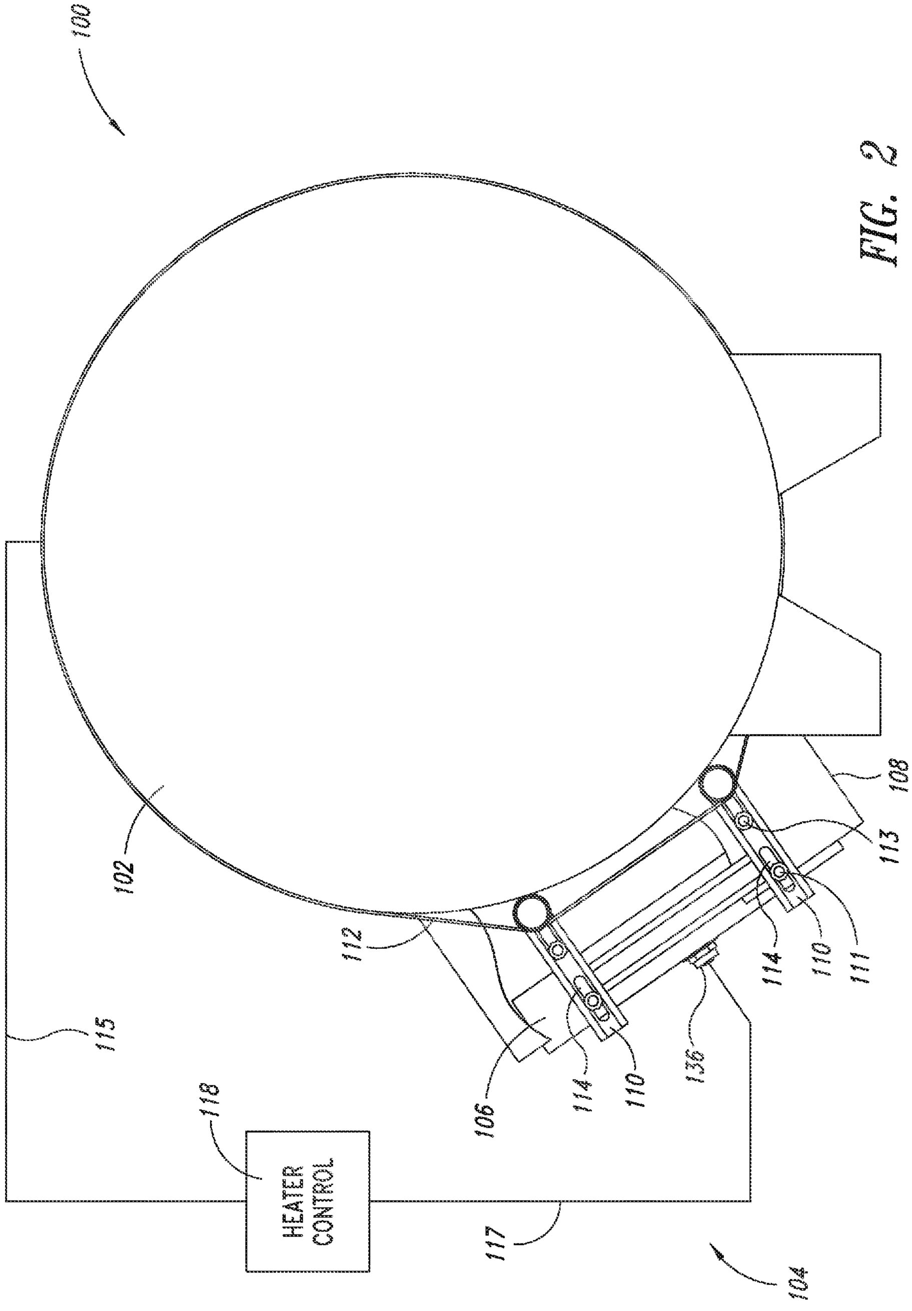
FIG. 2 is an end view of the system of FIG. 1.

FIGS. 1 and 2 show an LPG storage system 100 according to an embodiment, which includes an LPG tank 102 and a catalytic tank heater system 104. The heater system 104 includes a catalytic heater element 106, a heater control 118, a shroud 108, mounting brackets 141, support frames 110, and straps 112. The support frames 110 are coupled to the tank 102 by the straps 112. The catalytic element 106 is coupled to the mounting brackets 141, which extend between the support frames 110, and are coupled thereto by first fasteners 111 via slot apertures 114 of the support frames. The slot apertures 114 permit adjustment of the position of the catalytic element 106 relative to the wall of the tank 102, to provide for appropriate air circulation and transfer of radiant heat from the element to the tank. The support frames 110 hold the catalytic element 106 spaced from and facing the wall of the tank. Along a line where the catalytic element 106 lies closest to the tank, the distance between the element and the tank is preferably between one-quarter inch and eight inches, more preferably between one-quarter inch and five inches, and most preferably, about one-half inch. The shroud 108 is coupled to the support frames 110 by second fasteners 113, and serves to shield the catalytic element 106 from debris and unintentional contact, and also to control air flow around the element. The shroud 108 is shown in FIGS. 1 and 2 with a portion cutaway so that the catalytic element is visible.

The heater control 118 is in fluid contact with the interior of the tank via an input line 115, and controls operation of the catalytic element 106 via output line 117. The catalytic element 106 is configured to operate by oxidation of vaporized gas from the tank 102 in accordance with known principles of catalysis, as regulated by the heater control 118.

The heater control 118 is configured to monitor the pressure in the tank 102, to control operation of the catalytic heater element 106 in response to variations in the tank pressure, in order to maintain supply pressure above a selected threshold. The pressure threshold is selected according to the requirements of the particular application, and will generally be higher than an anticipated maximum load pressure requirement, so that the tank heater system can come on line and begin to restore the pressure before it drops to a critical level.

Accordingly, when the tank pressure drops below the selected threshold, the heater control 118 detects the drop and initiates activation of the catalytic element 106. While the element 106 is in operation, vaporized gas from the tank is fed to the catalytic element 106, where it undergoes catalytic combustion, i.e., flameless oxidation of the fuel in the presence of a catalyst, which is accompanied by the release of heat. The heat is transmitted by radiation from the front face of the catalytic element 106 to the wall of the LPG storage tank 102, where it is absorbed and conducted to the liquefied gas inside, offsetting the temperature and pressure drop caused by self-refrigeration as gas is drawn from the tank.

Figure 3:
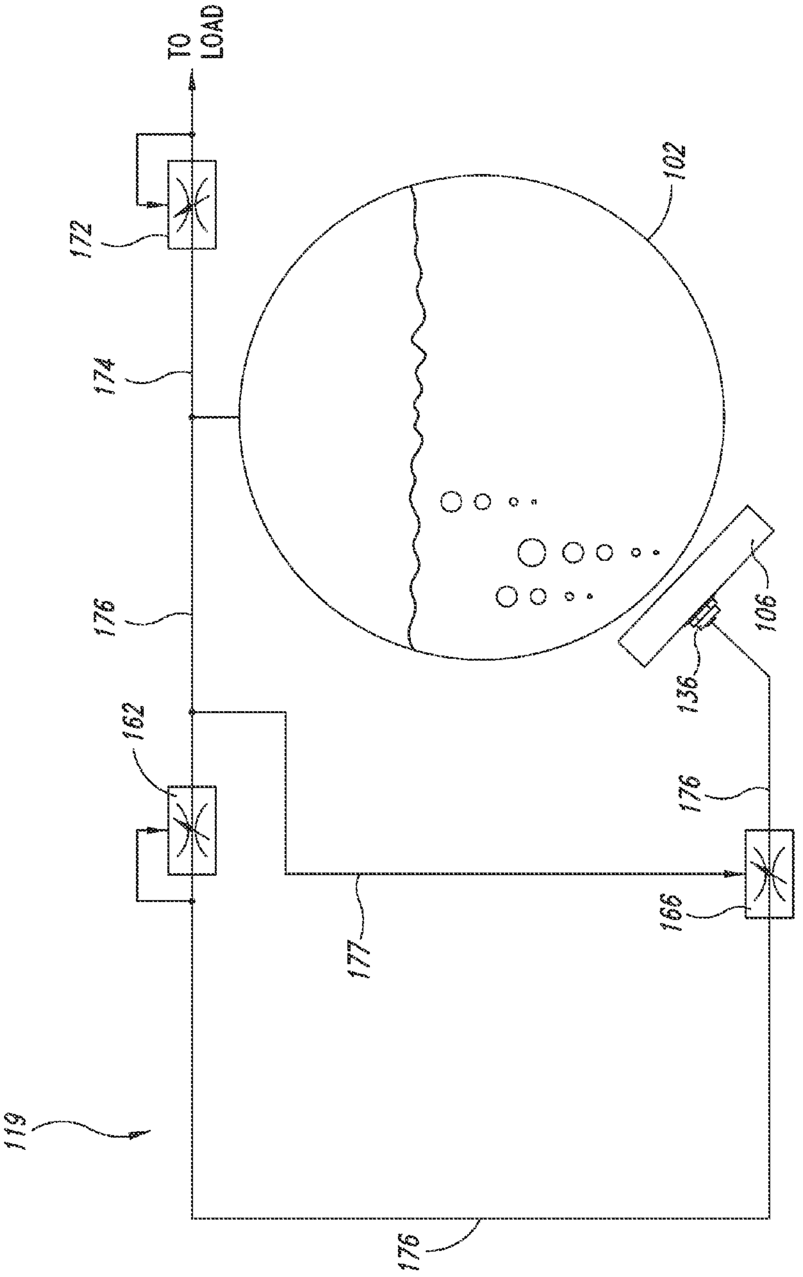
FIG. 3 is a schematic diagram of a catalytic tank heater control circuit according to an embodiment.

FIG. 3 shows a schematic drawing of a heater control circuit 119 according to one embodiment, which can operate, for example as the heater control 118 described with reference to FIG. 2. The heater circuit 119 includes a catalytic heater element 106, and first and second pressure regulator valves 163, 166. The catalytic heater element 106 includes a gas supply port 136. Gas supply lines 176 extend from an outlet 173 of the tank 102 to the first pressure regulator valve 163, from the first pressure regulator to the second pressure regulator valve 166, and from there to the catalytic heater element 106. A pressure feedback line 177 is coupled to provide direct tank pressure to a control terminal 167 of the second pressure regulator valve 166. The first pressure regulator valve 163 is configured to regulate pressure from the tank to an appropriate supply pressure, such as, e.g., 5 psi, which is provided to the second pressure regulator. Although not part of the heater control circuit 119, a third pressure regulator valve 172 is shown, coupled to regulate pressure in a gas supply line 174 to supply the load of the system. In embodiments where the supply pressures of the control circuit 119 and the load can be substantially equal, the third pressure regulator 172 may not be required. Instead, the first pressure regulator may be configured to provide regulated gas to both the heater control circuit 119 and the load, in which case, the supply line 174 will be coupled to draw from the line 176 downstream from the first pressure regulator 163.

In operation, the tank 102 supplies vaporized gas to the load as required, according to known processes, absorbing heat from its environment to boil the liquefied gas as it is drawn. As long as the gas pressure remains above a selected threshold, the pressure at the control terminal 167 of the second regulator valve 166 is sufficient to hold the valve closed. However, in the event the pressure drops below the threshold, the valve 166 opens and the catalytic heater element 106 is activated to produce radiant heat by catalytic oxidation of the gas. As pressure drops in the tank 102, the reduction of pressure, as transmitted by the feedback line 177 to the control terminal 167 of the second regulator valve 166, opens the valve further, increasing the gas flow to the heater element 106, and thereby increasing the amount of heat produced. As heat from the catalytic heater element 106 is absorbed by the tank 102, it is conducted to the interior of the tank, and transferred to the liquefied gas inside, warming the gas and increasing the equilibrium temperature, resulting in an increased rate of boiling, thereby increasing tank pressure. The increased tank pressure is fed back, via the feedback line 177, to the second regulator valve 166, which reduces gas flow as the pressure rises, thereby regulating the tank pressure.

There are a number of parameters associated with operation of the second regulator valve 166 including the threshold at which the valve opens as tank pressure drops, the threshold at which the valve closes as tank pressure rises, and the change in aperture size per unit of change in control pressure ($\Delta a/\Delta p$), i.e., the degree to which the valve opens or closes in response to a given change in pressure at the control terminal 167. Additionally, the $\Delta a/\Delta p$ may in some cases be non-linear, so that, for example, at a relatively high level of tank pressure, a change of one psi at the control terminal 167 may produce one change in aperture, while at a lower tank pressure, a one psi change may produce a larger or smaller change in aperture. The values may also be selected to include hysteresis, so that drops in pressure produce one value of $\Delta a/\Delta p$, while rises in pressure produce a different value. Values for such parameters can be selected according to the particular application.

For example, in an application where the load requirements and the ambient temperature are such that the rate of draw by the load normally exceeds the maximum unassisted flow rate by a small amount, the tank heater system, if configured with typical parameter settings, will turn on as the tank pressure drops, warming the tank and bringing the pressure up to an acceptable level, at which point the system will shut off, whereupon the tank pressure will immediately begin to drop again, until the heater system is again required to turn on, to repeat the cycle. To avoid the continual cycling of the system, and improve efficiency, parameters of the second regulator valve 166 can be selected so that the catalytic heater element is always in operation, but at a lower average output. This might involve reducing the $\Delta a/\Delta p$ at pressure levels close to the thresholds, but increasing the $\Delta a/\Delta p$ at lower tank pressures. In this way, the heater output initially increases by very small amounts as the tank pressure drops below the turn-on threshold, then increases by larger amounts if the tank pressure drops significantly below the threshold. As a result, the average tank pressure is lowered slightly, preferably to a value below the turn-off threshold. However, the more continual operation avoids constant repetition of the relatively less efficient warm up period during which the catalytic heating element is warmed to its light-off temperature.

For most applications, it is preferable that the turn-on threshold be set to a pressure corresponding to an equilibrium temperature that is greater than 32°. This will prevent the formation of ice on the outside of the tank, which might otherwise interfere with proper and efficient operation of the heater.

Also shown in FIG. 3 is an optional alternate fuel source 182, coupled to the first regulator valve 163 via alternate gas supply line **176*b*, shown in dotted lines. In the case where a storage tank similar to the tank 102 of FIG. 3 is used to store liquefied gas that is not flammable, or is otherwise not appropriate for use in a catalytic heater system, such as, e.g., anhydrous ammonia, vapor from the storage tank cannot be used to operate the catalytic heater 106. In such a case, the feedback line 177 is coupled directly to the outlet 173 of the tank 102, and the alternate supply line 176*b* replaces the portion 176*a* of the supply line 176. The heater control circuit 119 operates substantially as described above to control the catalytic heater 106 to warm the tank 102, but draws fuel from the alternate fuel source 182**.

Additional heater control circuits are described later according to respective embodiments. While they are not shown as having optional alternate fuel sources, it will be recognized that an alternate fuel source can be provided for such control circuits as necessary, and can be configured substantially as shown with reference to FIG. 3.

Figure 4:
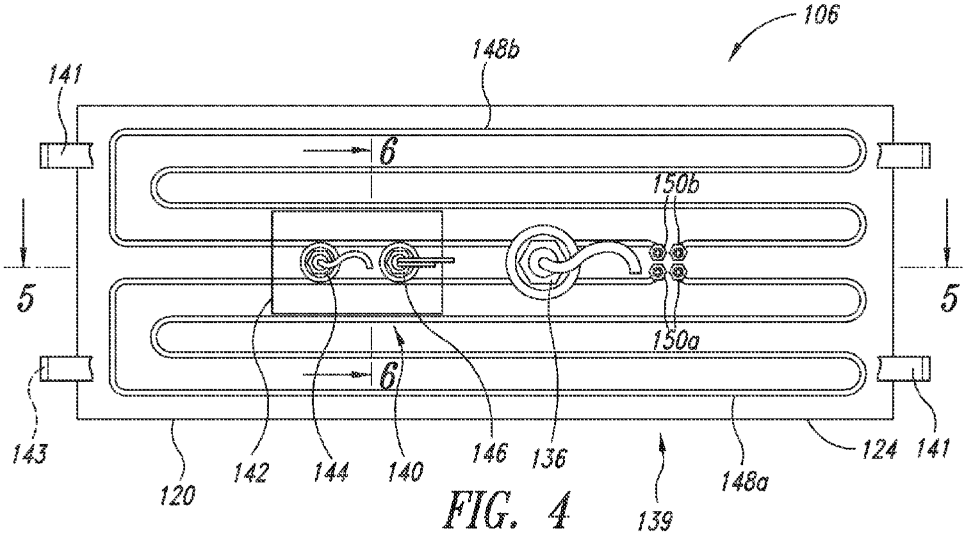
FIG. 4 is a diagrammatic plan view of a catalytic heater according to an embodiment, showing configurations and positions of various features as viewed from the back of the device.
Figure 5:
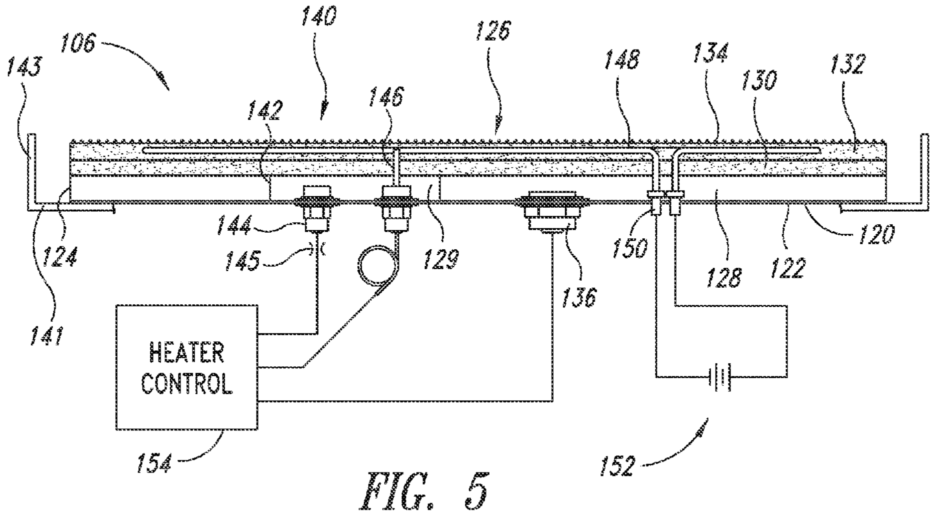
FIG. 5 is a diagrammatic view of the heater of FIG. 4 showing configurations and positions of various features, the view taken from a side of the device along lines 5-5 of FIG. 4.
Figure 6:
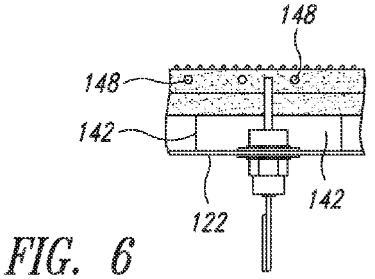
FIG. 6 is a diagrammatic view of the catalytic heater of FIG. 4 showing configurations and positions of various features, the view taken from an end of the device along lines 6-6 of FIG. 4.

Turning now to FIGS. 4-6, a catalytic heater element 106 is shown, according to one embodiment. FIG. 4 shows the element in a bottom plan view showing selected features as viewed from the back, with the back panel and additional details omitted to better show the arrangement of the selected features. FIG. 5 is a sectional view of the catalytic heater element 106 of FIG. 4, taken along lines 5-5, and FIG. 6 is a sectional view of a portion of the catalytic heater element of FIG. 4, taken along lines 6-6. The heater element 106 comprises a housing 120 that includes a back panel 122, sides 124 and a front grille 134. The interior of the heater element 106 is divided horizontally (as viewed in FIG. 5) into a plenum chamber 128, a gas-permeable diffusion and insulation layer 130, and a catalyst layer 132. The diffusion/insulation and catalyst layers 130, 132 are supported and separated from the back panel 122 by an internal grid or perforated panel, creating a gas plenum chamber 128, such as are well known in the art. A fuel supply port 136 is positioned to provide fuel to the plenum chamber 128. The sides 124 and back panel 122 of the housing 120 are substantially gas tight, so that gas flowing into the plenum chamber 128 from the fuel supply port 136 flows into the plenum chamber 128 and rises through the diffusion/insulation layer 130 and the catalyst layer 132.

Mounting brackets 141 are coupled to the back panel 122 of the housing 120, and, in the embodiment shown, extend the length of the housing, although most of the central portions are cut away so as not to obscure other details of the drawings. Tabs 143 extend from the mounting brackets toward the front of the housing 120, and provide means for mounting the heater element 106 to additional support structure. Where the catalytic element 106 is employed in a tank heater system like that described with reference to FIGS. 1 and 2, apertures can be provided in the tabs 143, through which the fasteners 111 pass to couple the element to the mounting frames 110. The mounting brackets 141 can be coupled to the housing 120 by any appropriate means, such as, e.g., screws, rivets, or adhesive. Additionally, the shape and form shown are merely exemplary. Mounting brackets can be attached to extend from the top to the bottom to the housing, as viewed in FIG. 4, rather than side to side, or can be attached only to the sidewalls 124, rather than across some portion of the back panel 122. Furthermore, the mounting brackets can be omitted entirely and other appropriate means for mounting the heater element 106 used, as required for the particular application.

The catalytic heater element 106 is divided into a main heater 139 and a pilot heater 140 by sidewalls 142, coupled to the back panel 122 in a substantially gas-tight fashion. The pilot heater 140 includes a pilot supply port 144 and a thermocouple 146. In FIGS. 5 and 6, the sidewalls 142 are shown extending from the back panel through the plenum chamber 128 and the diffusion/insulation layer 130 to the back of the catalytic layer 132, defining a separate pilot plenum chamber 129. However, according to other embodiments, the sidewalls 142 can extend only as far as the back of the diffusion/insulation layer 130, or as far as the front of the catalytic layer 132. The pilot supply port 144 includes an orifice 145 which limits the volume of fuel that can enter the pilot heater 140. The thermocouple 146 is positioned to sense the temperature of the catalyst layer 132 within the perimeter of the pilot heater 140.

To initiate combustion, the temperature of the catalyst must be raised above the activation temperature, i.e., the temperature at which catalysis of the particular fuel and catalyst combination is self-sustaining. In the case of petroleum gas, the reaction temperature is about 250°-400° F. (about 120°-200° C.), depending on factors that include the formulation of the gas and the catalyst employed. In the embodiment of FIGS. 4-6, an electric heating element 148 is embedded in the catalyst layer 132, which can be used to heat the catalyst and initiate combustion. Portions of the electric heater element 148 extend across the pilot heater 140 via slots 141 in the sidewalls 142 of the pilot element 140, as shown in FIG. 6.

For initial operation, an electrical power source 152 is coupled to terminals 150 of the heating element 148, which heats to a temperature above the light-off temperature of the fuel supplied to the element 106. As the temperature of the catalyst in the catalyst layer 132 rises, the thermocouple 146 begins to produce a small electric current. When the temperature reaches a selected threshold, the heater control 154 begins to supply fuel at least to the pilot heater 140, and catalytic combustion is thereby initiated in the pilot heater. The power to the electric element 148 is then removed. The fuel supplied to the pilot heater 140 via the pilot supply port 144 is controlled by the heater control 154 to continue flowing as long as the current from the thermocouple 146 is greater than a selected value. Thus, once the pilot is initially activated, absent a system malfunction or complete exhaustion of the available fuel, the pilot heater will continue to operate perpetually.

Once the pilot heater 140 is initially activated, any time thereafter that the main heater 139 is operated, combustion will be initiated by heat from the pilot heater, as described below. Thus, there is generally no requirement for a permanent connection of the system to an electric power source for operation of the electric heating element 148. Instead, electric power can be provided via a temporary connection or source. In a preferred embodiment, the catalyst layer 132 extends unbroken across the entire housing 120, including the pilot heater 140. During pilot operation, fuel that enters via the pilot supply port 144 is constrained by the sidewalls 142 to the pilot plenum chamber 129. As fuel rises through the catalyst layer 132, it dissipates beyond the perimeter of the pilot heater 140 to a small degree, but is largely constrained to that portion of the heating element, where it reacts with the catalyst layer to oxidize, and release heat, thereby maintaining that part of the catalyst layer at a temperature well above the reaction temperature of the fuel.

According to an embodiment, the pilot heater 140 consumes less than about 20% of the fuel consumed by the heater element 106 when the heater element is operating at full power. According to another embodiment, the pilot heater 140 consumes less than about 15% of the fuel consumed by the heater element 106 when the heater element is operating at full power. According to a further embodiment, the pilot heater consumes about 10% or less than of the fuel consumed by the heater element 106 when the heater element is operating at full power.

When the heater control 154 initiates operation of the main heater 139, fuel is supplied to the fuel supply port 136, from which it flows into the plenum chamber 128, and rises through the diffusion/insulation layer 130 to the catalyst layer 132. In the area immediately surrounding the pilot heater 140, the catalyst layer 132 is already at or above the activation temperature, so fuel immediately begins catalytic combustion, releasing additional heat and quickly bringing the remainder of the catalyst layer beyond the activation temperature. Thereafter, the heat produced by the main heater 139 is controlled by regulation of the fuel to the fuel supply port 136. When heat is no longer required, the supply to the fuel supply port 136 is shut off, after which the main heater 139 shuts down, leaving only the pilot heater 140 in operation.

In the embodiment of FIGS. 4-6, the electric element 148 extends across the entire housing 120. Thus, while the pilot heater 140 is in operation, the electric element 148 is kept hot in the immediate area of the pilot heater. Heat from the pilot heater 140 is transmitted by conduction in the electrical element 148 to the area surrounding the pilot heater, so that portions of the catalyst layer 132 along the paths of the electric element 148 are continually maintained above the light-off temperature. When fuel is supplied to the main heater 139, those heated portions of the catalyst layer 132 immediately begin catalytic combustion, which accelerates activation of the remainder of the catalyst layer.

If the requirement for heat from the catalytic element 106 is seasonal, the pilot heater can be shut down once the likely need has passed, in order to conserve the small amount of fuel consumed by the pilot heater.

In the embodiment of FIGS. 4-6, the electric element 148 is shown as comprising separate electric element sections **148*a* and 148*b*, with respective terminals 150*a* and 150*b*. This arrangement is not essential, but provides some advantages. For example, each section can be configured to produce a requisite level of heat when connected to a 110-120 volt AC power supply, which is standard in many parts of the world, including the U.S. In that case, the sections 148*a* and 148*b* can be connected in parallel to produce the necessary heat. On the other hand, where the same system is to be used in a location where the available power is at a 220-240 volt level, which is also very common, the sections can be coupled in series, so that each drops half the available voltage, thereby producing the same heat output. Alternatively, one of the sections can be configured to operate from a standard power supply, while the other is configured to operate at another power level, such as, e.g., 12 volts. In this way, where municipal power is not available, a single section can be powered by a portable source, such as a car battery, to initiate combustion. Thereafter, as previously discussed, the pilot heater 140** will continue to operate for normal use.

In some embodiments, heat conductors, such as, for example, steel or aluminum rods, are provided, embedded in the catalyst layer and extending through the pilot heater and into the main heater, substantially as shown with reference to the electric element 148. The heat conductors conduct heat from the pilot heater to the catalytic material of the main heater, maintaining a portion of the catalytic material above the light-off temperature, to quickly initiate catalytic combustion when the main heater is activated. Heat conductors are particularly useful in embodiments that do not include an electric heating element like the element 148 described above, which otherwise serves a similar purpose.

Figure 7:
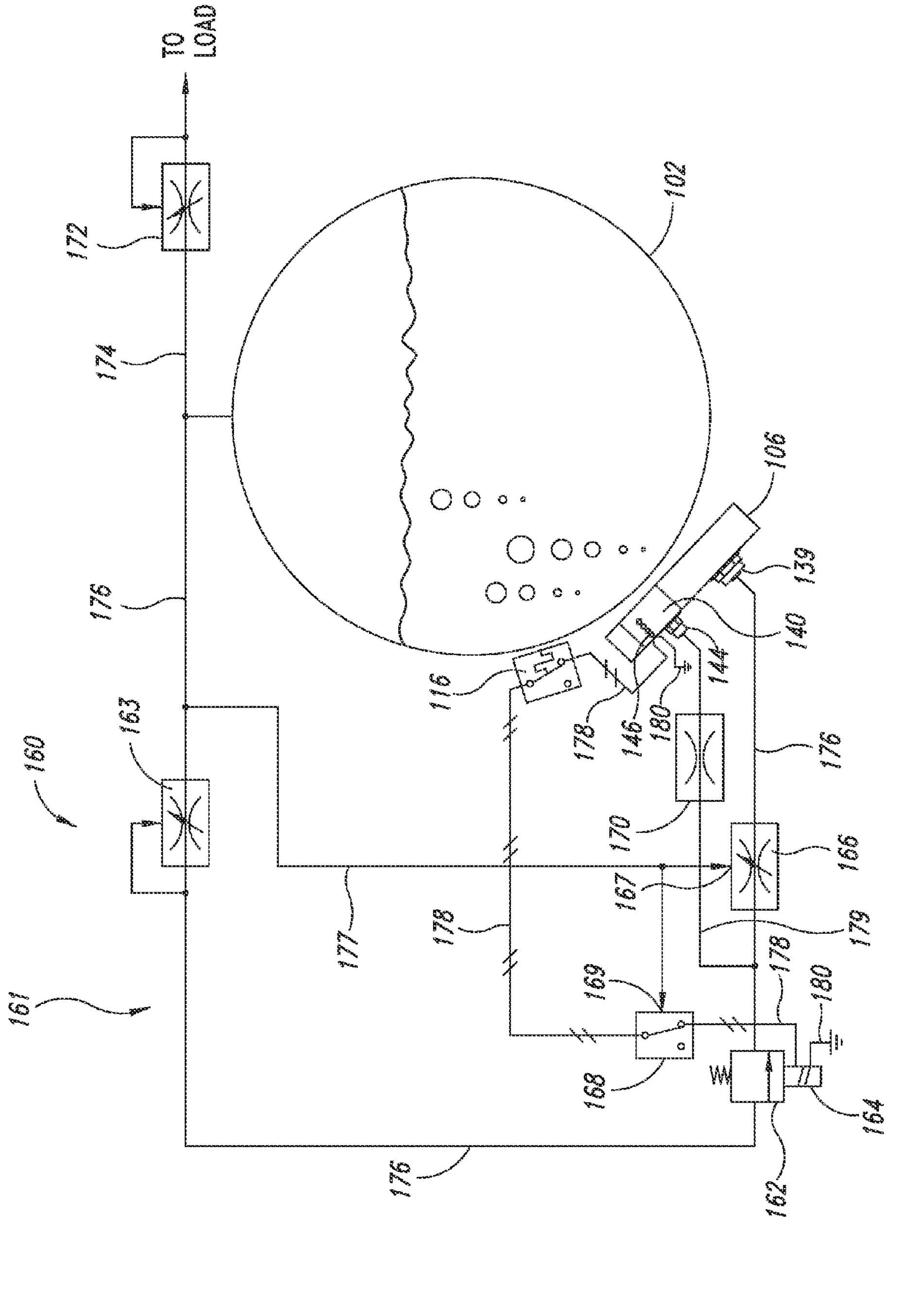
FIG. 7 is a schematic diagram of a catalytic tank heater control circuit according to an embodiment.

Turning now to FIG. 7, a schematic drawing of a tank heater system 160 is shown, according to an embodiment. The system 160 includes a catalytic heater element 106, substantially as described with reference to FIGS. 4-6, and a heater control circuit 161 that includes a number of components previously described with reference to the heater control 119 of FIG. 3, which components are provided with identical reference numbers. In addition to previously described components, the heater control circuit 161 includes a pressure limit switch 168, a heater shut-off valve 162, a solenoid 164 arranged to control operation of the heater shut-off valve, and a temperature-controlled switch 116. The pressure limit switch 168 is configured to open if tank pressure exceeds a maximum pressure threshold. The temperature-controlled switch 116 is coupled to the wall of the tank 102 near the level of, or slightly above the uppermost part of the catalytic heater element 106, and is configured to open when the temperature of the tank wall rises above a switching threshold, such as, e.g., 125° F.

A pilot supply line 179 is coupled to the gas supply line 176 at a point between the shut-off valve 162 and the second regulator valve 166, and extends to the pilot supply port 144. Accordingly, fuel for the pilot heater 140 is regulated by the first regulator valve 163 and controlled by operation of the shut-off valve 162, but is not subject to control by the second regulator valve 166. Because the first regulator valve is configured to supply fuel at a volume and pressure appropriate for operation of the main heater element 139, an orifice 170 is provided to limit the flow of fuel to the pilot element, which requires much less fuel for operation. While shown as a separate component, such an orifice may be incorporated into the pilot supply port 144, or its function may be accomplished simply by selection of the bore size of the pilot supply line.

The thermocouple 146 of the pilot element 140 is coupled in series, via electrical lines 178, with the temperature-controlled switch 116, the pressure limit switch 168, and the solenoid 164, with ends of the resulting circuit coupled to circuit ground 180. The feedback line 177 is coupled to the control terminal 167 of the regulator valve 166, as previously described, and also to a control terminal 169 of the pressure limit switch 168.

When the pilot heater 140 is in operation, the thermocouple 146 produces an electric current that is transmitted to the solenoid 164 via the temperature-controlled switch 116 and the pressure limit switch 168. When sufficient current is provided, the solenoid 164 acts to move or hold the shut-off valve 162 open so that gas can flow through the valve to the catalytic heater element 106. If combustion in the pilot heater 140 stops, the thermocouple will stop producing current, and the solenoid 164 will permit the shut-off valve 162 to close, shutting off fuel supply to the heater element 106. Likewise, if the temperature of the tank wall rises above the switching threshold, the temperature-controlled switch 116 will open, the current will be interrupted, and the shut-off valve will close. Finally, if tank pressure at the control terminal 169 rises above a maximum pressure threshold, the pressure limit switch 168 will open, interrupting the current and closing the shut-off valve 162. In other respects, the heater control circuit 161 operates substantially as described with reference to the heater control circuit 119 of FIG. 3.

As the level of liquefied gas in the tank 102 drops, eventually, the liquid level inside the tank drops into a region directly opposite the catalytic element 106 outside the tank. As the liquid level continues to drop, an increasing portion of the heat produced by the element 106 heats the outside of the tank above the fluid level inside the tank. Efficiency of heat transfer from the tank wall to the liquid LPG drops significantly as more and more of the tank wall is exposed to heat from the element 106, without liquid on the opposite side to which heat can be directly transmitted. Accordingly, the temperature of the tank wall at the level of the temperature-controlled switch 116 begins to rise. At the same time, because the surface area of the remaining liquefied gas in contact with the tank wall diminishes significantly as the tank nears empty, less of the heat from the tank wall is transmitted to the liquid, and the rate of self refrigeration increases. This further reduces tank pressure, causing the second regulator valve 166 to open further, and resulting in an increase of fuel to the heater element 106 to restore tank pressure. In such a case, there is a potential danger of damage to the painted surface of the tank by the excessive heat produced. To prevent the possibility of such damage, the temperature threshold at which the switch 116 opens is selected to interrupt the current from the thermocouple before the tank wall temperature reaches a dangerous level. When the switch 116 opens, current to the solenoid 164 is interrupted, permitting the shut-off valve 162 to close. This shuts off not only the main heater 139, but also the pilot heater 140. If the rate of draw by the load continues, it is likely that tank pressure will shortly thereafter drop below the regulated pressure, affecting operation of the gas-powered devices of the load.

Ideally, the tank 102 is refilled before the level drops to this point, but loss of function of gas appliances can at least serve as a reminder that the tank should be filled. Nevertheless, even if the tank is not refilled, the pilot heater can be restarted once the temperature of the tank wall has dropped below the threshold. Thus, in exigent circumstances, the remaining fuel in the tank can be accessed, although unless the load demand is reduced, the same outcome will eventually occur.

Figure 10:
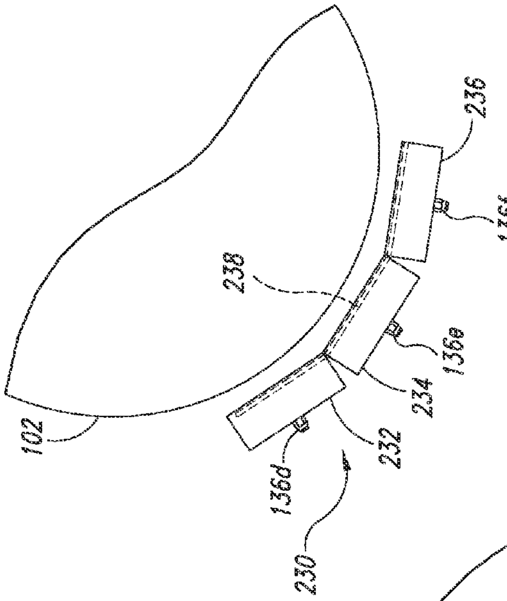
FIGS. 8-10 are end view diagrams showing selected features of catalytic tank heater systems according to respective embodiments.
Figure 9:
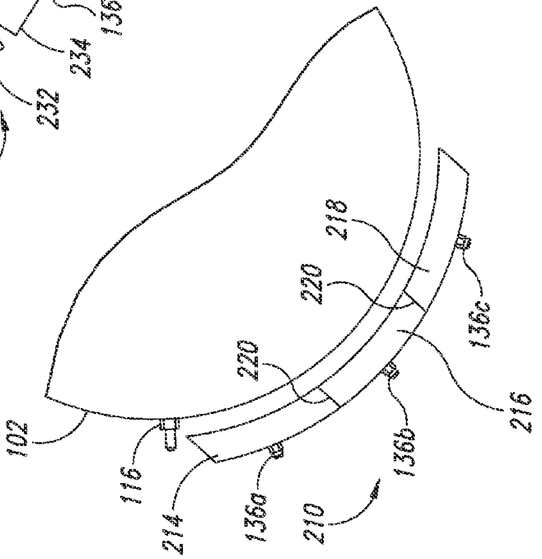
Figure 8:
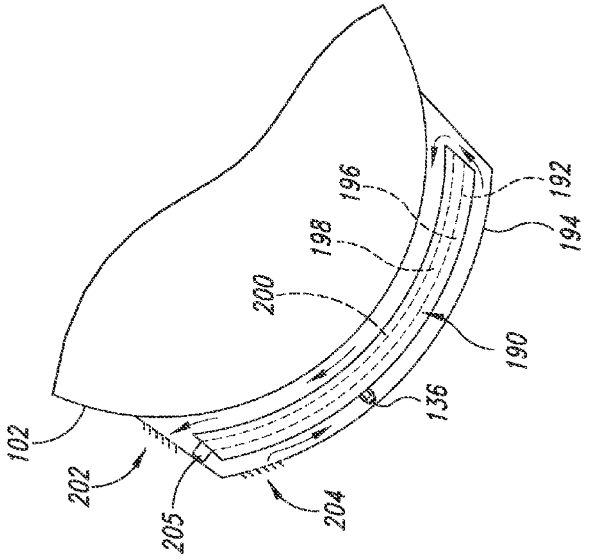

FIGS. 8-10 show, in side views, catalytic heater elements according to respective embodiments. As shown in FIG. 8, a heater element 190 is provided, in which the element is curved to conform to the contour of the tank 102. The catalytic heater element 190 is in the form of a segment of a cylinder whose radius, at least at the face of the element, preferably exceeds a radius of the tank by an amount substantially equal to the distance between the element and the outer surface of the tank, so that the face of the element is substantially equidistant from the tank wall across its entire surface. This arrangement permits a more efficient transfer of heat, as compared to the rectangular elements of previous embodiments.

A rectangular element has one line, lying parallel to a longitudinal axis of the tank, along which it lies closest to the tank, and along which heat is most effectively transferred to the tank. In contrast, the catalytic heater element 190 of FIG. 8 is equidistant from wall of the tank 102 across the entire face of the element, so that heat is more efficiently transferred to the tank over the entire surface of the element. The heater element 190 includes a plenum chamber 196, a diffuser/insulation layer 198, and a catalyst layer 200, each of which conforms to the contour of the face of the element, as shown in dotted lines in FIG. 8. Other features of the element are substantially similar to features described with reference to previous embodiments are not shown in detail, but can be provided as required for a particular application. For example, the element 190 can be provided with a pilot heater and an electric element, can be mounted to the tank 102 by appropriate means, and can be coupled to a heater control such as described elsewhere in this disclosure.

FIG. 8 also shows a shroud, or cabinet 194, enclosing the heater element 190. The cabinet 194 provides protection for the heater element 190 from weather and small animals, and also prevents unintentional contact with the element during operation. Louvers or perforations 202 and 204 are provided to permit entry and exit of air into the cabinet 194, so that oxygen necessary for catalytic combustion can be continually provided, and a baffle 205 extends from an uppermost side of the element 190 to an inner surface of the cabinet 194 and along the length of the element, to prevent passage of air at that point. Air passing between the heater element 190 and the wall of the tank 102 is heated by the heater element so that it rises, and flows out of the cabinet 194 via louvers 202. Heated air rising at the upper side of the cabinet 194 close to the tank creates a chimney effect, which draws replacement air into the cabinet via louvers 204 to circulate around the element 190 as shown by the arrows in FIG. 8. Much of the heat that inevitably passes to the back of the element 190 is transferred to the air as it enters the cabinet, where it is carried to the front and combined with the heat from the catalytic reaction. This also permits the element 190 to be positioned nearer to the bottom of the tank, because the chimney effect provides sufficient air circulation to maintain catalytic combustion. In contrast, a planar catalytic heater tends to operate at lower efficiency when positioned with the face at an angle that is much closer to horizontal than about 45 degrees.

FIG. 9 shows a catalytic heater element 210 according to another embodiment, in which the element is divided by internal walls 220 into three sections 214, 216, and 218 each provided with a respective supply port 136*a*, 136*b*, and 136*c*. In other respects, the heater element 210 is substantially similar to the element 190 of FIG. 8. According to the embodiment of FIG. 9, each of the sections is separately controllable, so that as the level of LPG inside the tank 102 drops, the sections can be shut down in sequence, so that less heat is radiated to portions of the tank wall above the level of the LPG inside. In this way, the remaining LPG can be more efficiently heated, while avoiding, to at least some extent, overheating the tank wall. A pilot heater is preferably provided as part of the third section 218 so that the bottommost section can be activated, even when the remaining sections remain shut down. Heat conductors can be provided, extending between the sections, to assist in initial combustion. Control of the fuel supply to each of the supply ports 136*a*, 136*b*, and 136*c* can be provided with respective temperature controlled switches, which are attached to the tank wall adjacent to the respective section of the heater element. The switches controlling the separate sections are set to a lower temperature than the switch 116, and are able to detect the rise in temperature as the fluid level inside the tank drops below that switch. An exemplary circuit is described below with reference to FIG. 11. Alternatively, control of the respective sections can be on the basis of a signal from a tank level sensor. Such sensors are well known in the art, and are commonly used to indicate the level of liquid in an LPG storage tank. Here, a circuit can be configured to close a shut-off valve supplying fuel to the section 214, for example, when the level of liquid in the tank drops into the range in which the heat generated by that section strikes the tank, etc.

FIG. 10 shows a catalytic heater element 230 according to another embodiment, in which the element comprises first, second, and third separate catalytic elements 232, 234, 236, linked side-by-side, each having a respective supply port 136*d*, 136*e*, 136*f*. Heat conductors 238, such as, e.g., steel rods, extend in the catalyst layer from the third element 236 to the second and first elements 234, 232, to conduct heat from one to the next during initiation of combustion. In embodiments that include a pilot heater, it is positioned in the third element 236.

According to one method of operation, the first, second, and third elements 232, 234, 236 collectively function substantially as the catalytic element 106 described with reference to FIGS. 1-7, with each element being supplied from a common fuel line controlled by a single valve and distributed via a distribution head, for example. Because each element 232, 234, 236 is narrower than the single element 106, and is rotated along a longitudinal axis to directly face the tank wall, the overall transfer of energy to the tank is more efficient, and may approach the efficiency of the catalytic element 190 of FIG. 8. However, the catalytic element 230 of FIG. 10 is less costly to manufacture than either of the elements 190 or 210 because, to a large extent, it can be assembled from commercially available components using common procedures.

According to another method of operation, the first, second, and third elements 232, 234, 236 collectively function substantially as the three sections 214, 216, 218 of the catalytic heater element 210, as described above with reference to FIG. 9, so that each element is independently controlled, and can be shut off if the liquid in the tank drops below the level of the respective element.

Figure 11:
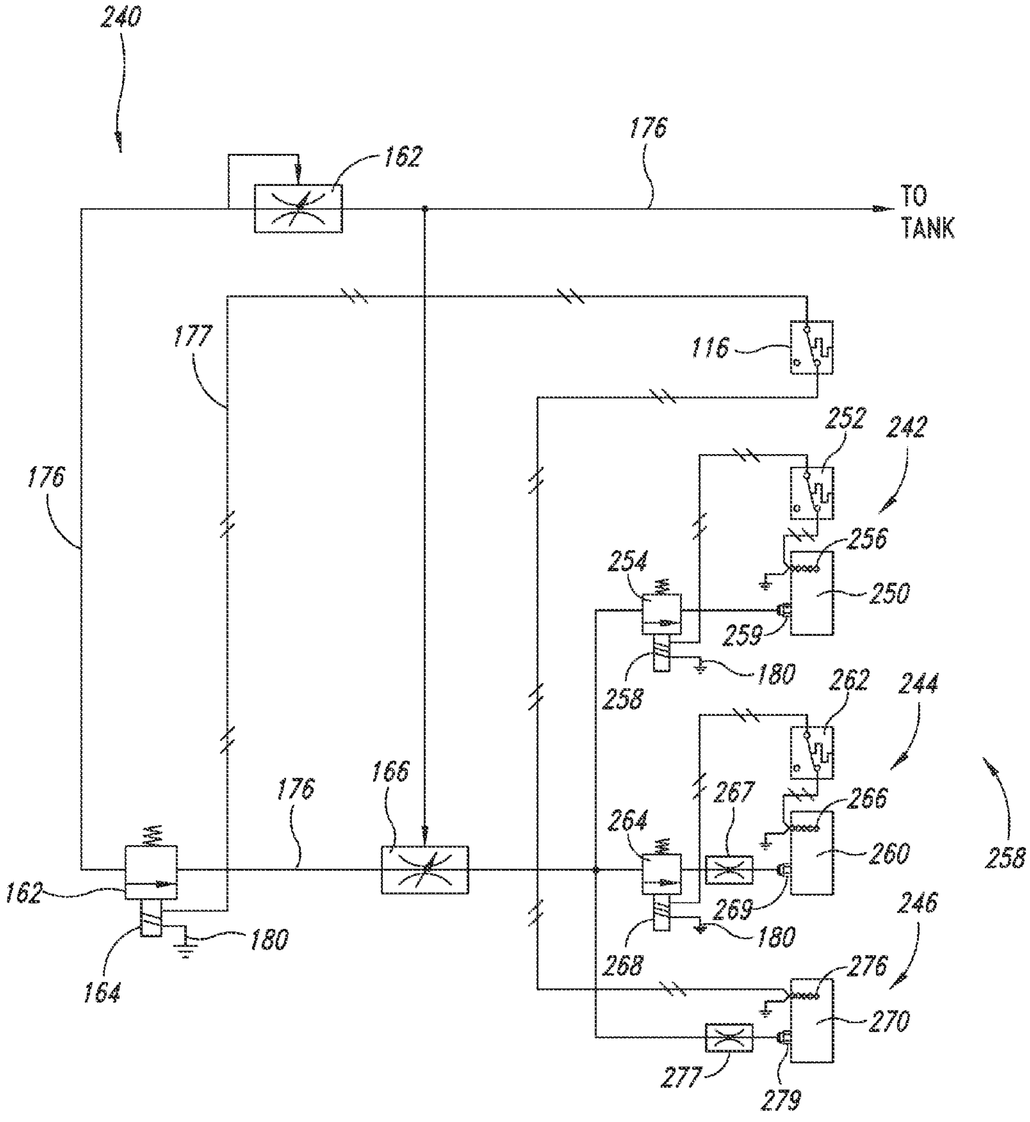
FIG. 11 is a schematic diagram of a circuit for controlling a catalytic tank heater that includes multiple heater units, according to an embodiment.

Turning to FIG. 11, a schematic diagram of a heater control circuit 240 is shown, according to an embodiment. The heater control circuit 240 is configured to control multiple heater units of a catalytic heater element, as described, for example, with reference to FIGS. 9 and 10. FIG. 11 shows first, second, and third heater units 242, 244, 246 that collectively form a catalytic heater element 258. The first heater unit 242 comprises a catalytic heater element 250, a temperature-controlled switch 252, and a shut-off valve 254. A thermocouple 256 is positioned in the heater element 250 and is electrically coupled in series with the switch 252 and a solenoid 257 of the shut-off valve 254. A fuel supply port 259 of the heater element 250 is coupled to the supply line 176 via the shut-off valve 254.

The second heater unit 244 comprises a catalytic heater element 260, a temperature-controlled switch 262, and a shut-off valve 264. A thermocouple 266 is positioned in the heater element 260 and is electrically coupled in series with the switch 262 and a solenoid 268 of the shut-off valve 264. A fuel supply port 269 of the heater element 260 is coupled to the supply line 176 via the shut-off valve 264. Fuel entering the catalytic heater element 260 first passes through an orifice 267.

The third heater unit 246 comprises a catalytic heater element 270, including a thermocouple 276, a fuel supply port 279, and an orifice 277. The thermocouple 276 is electrically coupled in series with the temperature-controlled switch 116 and the solenoid 164 of the shut-off valve 162. The fuel supply port 279 is coupled to the supply line 176 via the orifice 277.

The first, second, and third heater units 242, 244, 246 are positioned in the order shown, with the first heater unit positioned above the second heater unit, and the first and second heater units positioned above the third heater unit. The temperature controlled switch 252 is positioned against the wall of an LPG storage tank at a height that corresponds to the position of the catalytic heater element 250, and similarly, the temperature controlled switch 262 is positioned against the wall of the storage tank at a height that corresponds to the position of the catalytic heater element 260. The temperature controlled switch 116 is positioned against the wall of the storage tank at or above the height of the temperature controlled switch 252.

FIG. 11 does not show a pilot heater or other means for initiating combustion, but it will be understood that such means can be provided as described with reference to any of the embodiments. For example, if the heater units are arranged in physical contact with each other, a single pilot heater can be used to initiate combustion in all of them, as described with reference to FIGS. 10 and 11, in which case the pilot heater will be positioned in the catalytic heater element 270, which is lowermost of the heater elements.

The first, second, and third heater units 242, 244, 246 normally operate together as a single heater element controlled by the second regulator valve 166. If the liquid level within the tank drops into the range that is directly heated by the first heater unit 242, so that a portion of the heat from the catalytic heater element 250 strikes the tank wall above the level of the liquid in the tank, the tank wall above the liquid will become warmer than below the liquid level. The switching temperature of the temperature controlled switch 252 is selected so that the switch will open once the liquid level drops a small distance below the switch, thereby interrupting the current to the solenoid 257 and closing the shut-off valve 254. The heater unit 242 is thus shut down when the liquid level drops below that unit. Similarly, the second heater unit 244 is configured to shut down when the liquid level drops below its position. When a tank is heated at a point that is above the level of the liquid inside, a much greater portion of the heat is lost to the environment, which can significantly reduce efficiency of the heating system. Shutting down the first and second heater units 242, 244 when the liquid level drops below their respective positions therefore improves the overall efficiency of the system, in particular when such a heater system is used with LPG supply systems that are routinely drawn down below about 25% of tank capacity.

The temperature controlled switch 116 is configured to open at a much higher temperature threshold than the thresholds at which the temperature controlled switches 252 and 262 are configured to open, and acts as a safety device to protect the tank. If for any reason the tank temperature rises excessively, such as, for example, due to a malfunction in which one or both of the first and second heater units 242, 244 fail to shut down when the liquid drops below their respective levels, the temperature controlled switch 116 will open, interrupting the current to the solenoid 164, closing the shut-off valve 162, and shutting down the entire system.

When the first heater unit shuts down, as described above, the volume of fuel passing through the second regulator valve 166 is not proportionately reduced, so it is possible that the volume could exceed the combined capacities of the second and third heater units. The orifices 267 and 277 are provided to prevent a flow that exceeds the capacity of the respective catalytic heater element, but do not significantly limit normal levels of flow. This function may also be served by selection of the diameter of the individual supply lines or the size of the respective supply ports, or by other appropriate means.

The inventors built a prototype tank heater system substantially as described with reference to FIGS. 1, 2, and 4-7, which was installed on a 500 gal. LPG storage tank, and using the following commercially available components: for the regulator corresponding to the first pressure regulator 163, a Fisher® type 912, set to regulate pressure to 12-14 inches of water column (InWC), or about 5 psi; for the regulator corresponding to the second pressure regulator 166, a Mooney® Series 20™ regulator; for the switch corresponding to the pressure limit switch 169, a Barksdale™ Series 9692X pressure switch, set to open at 220 psi; for the valve corresponding to the shut-off valve 162, a BASO® H15 Series pilot valve; and for the catalytic heater element, a modified Cata-Dyne™ WX Series 18×48 infrared catalytic heater, with a maximum output of 25,000 btu/hr. The switch corresponding to the temperature limit switch 116 was set to open at 115° F. (about 46° C.).

Modifications and other components of the prototype embodiment were purpose built. These included components corresponding to the pilot heater 140, the mounting brackets 141, support frames 110, and shroud 108. The dimensions of the pilot heater, as defined by the sidewalls, was about 6 inches by 10 inches, or about 7% of the total area of the heating element, and in operation produced about 200-2000 btu/hr. In addition to the elements described with reference to FIGS. 1-7, the prototype system included access ports at various locations to enable pressure and temperature readings to monitor the systems operation.

In initial testing of the prototype tank heater system, the system performed exactly as anticipated. The system was configured to turn on when tank pressure dropped below 25 psi, and to turn off when tank pressure reached 35 psi. Total activation time, i.e., the period from the moment the second regulator valve opened to send fuel to the main heater, to the moment the entire main heater was at or above the light-off temperature, was about 15 minutes. Fuel consumption of the pilot heater was about 1 cf/hr. Or approximately 10% of the overall heater output.

Figure 12:
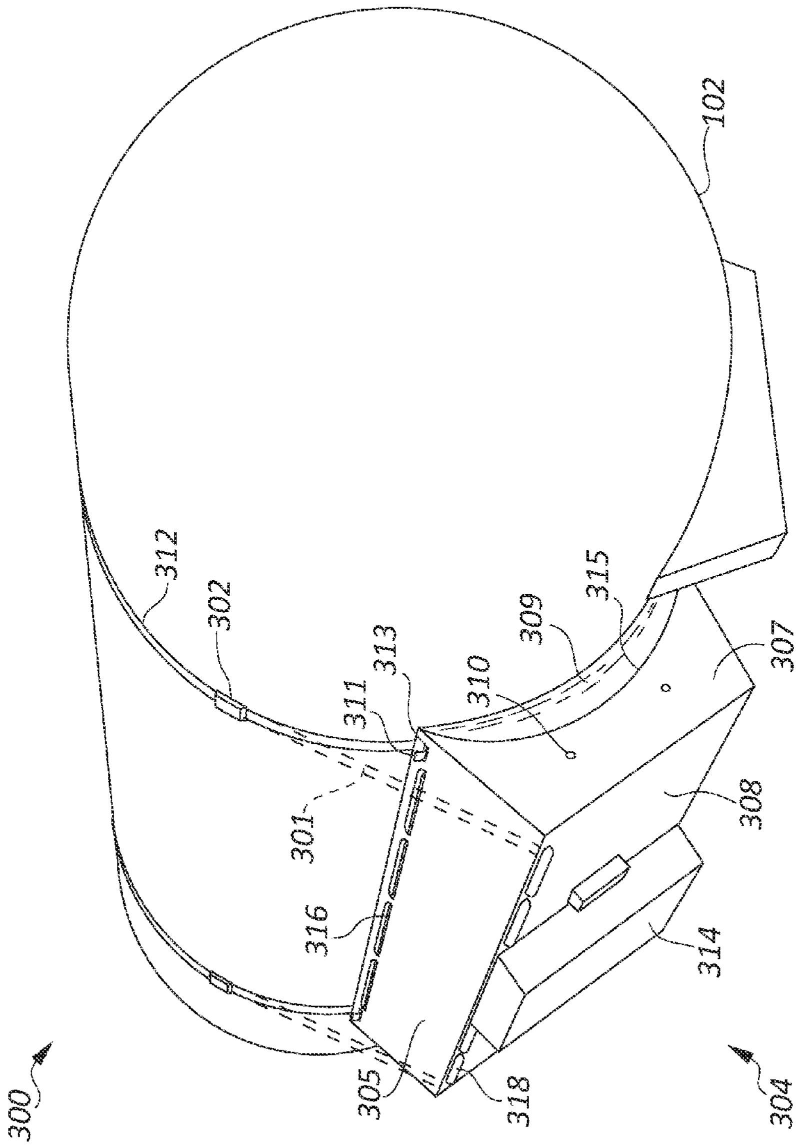
FIG. 12 is a perspective view of an LPG storage system according to an embodiment, including an LPG storage tank and a tank heater system.
Figure 13:
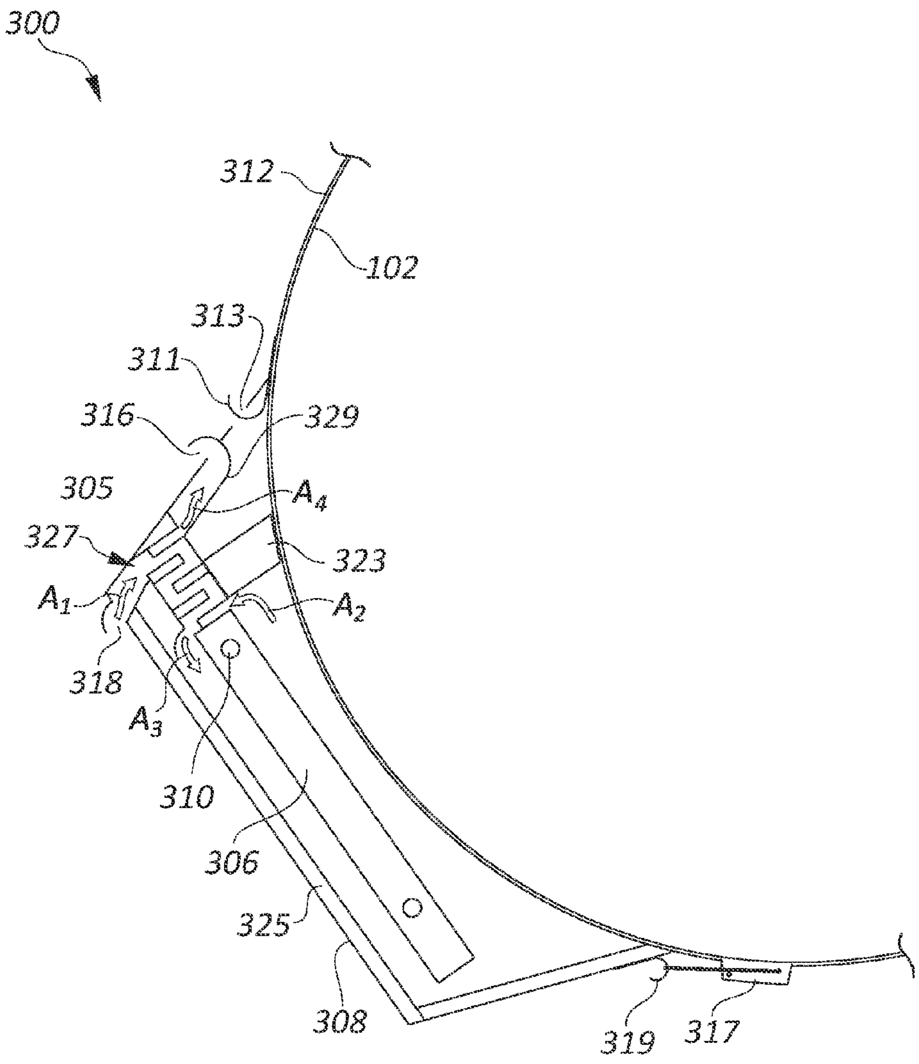
FIG. 13 is a section end view of the LPG storage system of FIG. 12.

FIGS. 12 and 13 depict an LPG storage system 300 according to another embodiment. The system 300 includes an LPG storage tank 102 with a tank heating system 304. The tank heating system 304 includes a catalytic heater element 306 and a shroud, or cabinet 308. Various details, including heater control components, pilot element, etc., are omitted to simplify the drawings, but it will be understood that features not shown, but necessary for proper operation, including any of the features described with respect to other disclosed embodiments, can be incorporated as appropriate.

Straps 312 are attached to the tank 102 by buckles 302. Each of the straps 312 includes first and second connectors 311, 317 configured to engage corresponding first and second attachment features 313, 319 of the cabinet 308. As shown in FIGS. 12 and 13, the first connector 311 is a hook and the first attachment feature 313 is a slotted aperture in the cabinet 308. The second connector 317 is shown as a toggle buckle configured to engage a hook coupled to a lower portion of the cabinet and serving as the attachment feature 319. The connectors and attachment features shown are provided as examples, only. Any of a wide variety of mechanisms, including many that are commonly available for similar applications, can be employed to couple the tank heating system 304 to the tank 102. For example, straps 301, shown in dashed lines, can be attached to the straps 312 and positioned to extend so as to engage the back of the cabinet 308 to hold it tightly against the tank. Buckles, attachment hardware, and tightening mechanisms are not shown, but are well known in that field of art.

End walls 307 of the cabinet 308 can be shaped to conform to the curvature of the tank so that when installed, sidewalls 305, which extend between the end walls 307, can be positioned against the tank wall, so that substantially the entire perimeter of the cabinet contacts the tank wall. Alternatively, as shown in FIG. 12, the end walls 307 include conformable panels 309 made from a resilient material such as, e.g., an elastomeric polymer like silicone, or synthetic rubber. When the cabinet 308 is positioned against the tank 102, the conformable panels 309 stretch to accommodate the curvature of the tank, thereby forming a substantially gas-tight seal. The conformable panels enable the tank heating system 304 to be mounted to tanks having a wide range of diameters and capacities. The curvature of the forward edge 315 of the rigid portion of the end walls 307 is selected to accommodate a tank having the smallest diameter to which the heating system 304 can be mounted, with full contact around the perimeter of the cabinet, without permitting contact between the tank wall and the face of the heating element 306.

A door 314 provides access through a back panel 303 to the interior of the cabinet 308. Inlet vents 318 provide passage of air through the back panel 303, and outlet vents 316 provide passage of air through the upper sidewall 305.

The catalytic element 306 is mounted to the cabinet 308 by fasteners 310, extending from the element to mounting apertures in the end walls 307 of the cabinet. A heat exchanger 327 is positioned between the heating element 306 and an inner surface of the cabinet 308, along the length of the element.

During installation on the tank 102, the cabinet 308 is positioned so that the hook 311 of each strap 312 engages the respective aperture 313, so that the cabinet hangs from the two hooks. The cabinet 308 is then rotated so that the lower portion of the cabinet swings under the tank 102 until bails of the toggle buckles 317 can engage the lower hooks 319. The toggle buckles 317 are then rotated to their locked positions, pulling the cabinet tightly against the tank, and securely coupling the cabinet to the tank. According to an embodiment, a resilient insulator material is provided along the front edges of the sidewalls 305 of the cabinet 308 to provide a substantially complete seal between the cabinet and the wall of the tank.

Referring to FIG. 13, in which the heat exchanger 327 is shown diagrammatically, airflow is indicated by arrows $A_1$-$A_4$. Because catalytic combustion requires oxygen, a source of oxygen is required for proper operation of the catalytic heating element 306. Thus, an air space is provided between the heater element 306 and the wall of the tank 102. As the oxygen in the air in front of the heating element is depleted, the air is heated by the operation of the element, so that it rises across the face of the element, pulling fresh air into its place. A resilient baffle 323 is positioned to press against the tank wall and fills the space between the heat exchanger and the tank. The baffle 323 blocks direct passage from the heating element 306 to the outlet vents 316, leaving passage through the heat exchanger as the only path to the outlet vents. Rising exhaust air therefore enters the heat exchanger 327 via an exhaust air inlet, as indicated at arrow A2, and exits via an exhaust air outlet, as indicated at arrow A4. Internal ducting 329 can be provided to reduce resistance to air passing to and from the heat exchanger 327 inside the cabinet 308.

As hot air rises in front of the heating element 306, air pressure inside the cabinet is reduced, which creates a vacuum to draw fresh air into the inlet vents 318 of the cabinet. Outside air is pulled into the inlet vents 318 and into a fresh air inlet of the heat exchanger 327 as indicated by arrow A1. As the fresh air passes through the heat exchanger, heat from the exiting exhaust air is transferred to the incoming fresh air, thereby conserving a portion of the heat that would otherwise be lost with the exiting exhaust air. The preheated fresh air exits the heat exchanger 327 by a fresh air outlet to the interior of the cabinet, as indicated at arrow A3. The fresh air is then drawn down across the back of the heating element 306, where it is further heated, until it passes under the element and begins to rise across the face of the heating element, continuing the cycle. Insulating 325 can be provided in the interior of the cabinet 308 to reduce the amount of heat lost through the back and sides of the cabinet.

Figure 14:
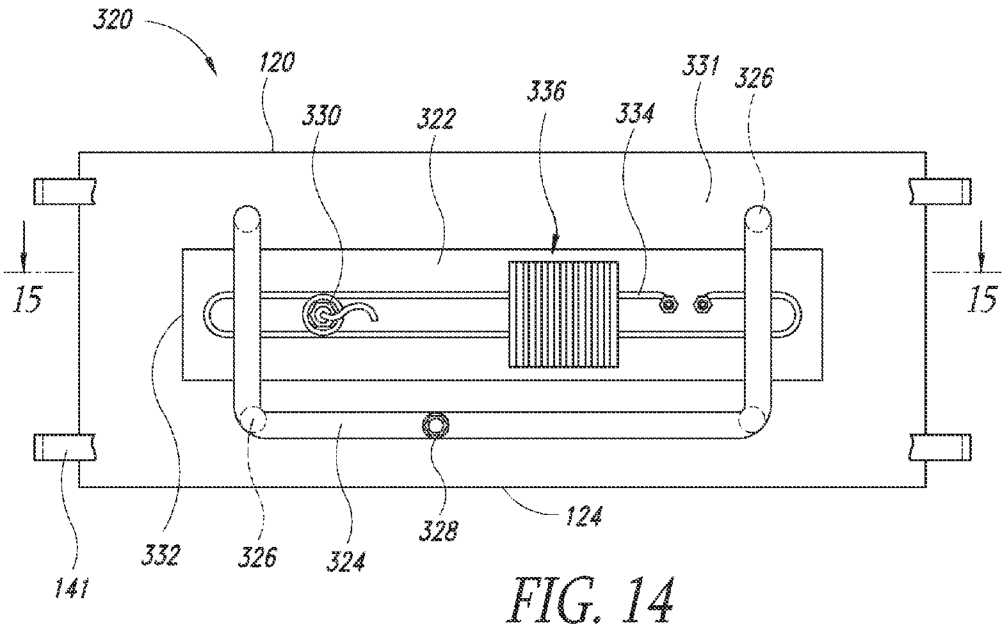
FIG. 14 is a diagrammatic plan view of a catalytic heater according to an embodiment, showing configurations and positions of various features as viewed from the back of the device.
Figure 15:
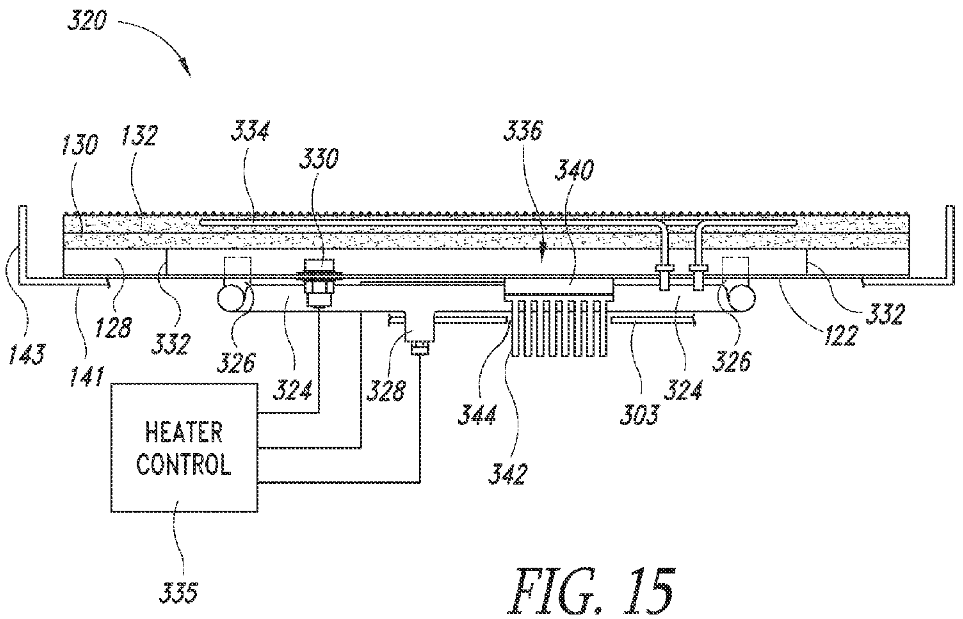
FIG. 15 is a diagrammatic view of the heater of FIG. 14 showing configurations and positions of various features, the view taken from a side of the device along lines 15-15 of FIG. 14.

Turning now to FIGS. 14 and 15, a catalytic heater element 320 is shown, according to another embodiment, in views that substantially correspond to the views of the element 106 of FIGS. 4 and 5. FIG. 14 shows the element 320 in a bottom plan view, and FIG. 15 is a sectional view of the catalytic heater element 320 of FIG. 14, taken along lines 15-15. Features that are substantially identical in function to corresponding features of previously described embodiments are identically numbered, and will not be described in detail.

The catalytic heater element 320 is divided into a main heater 331 and a pilot heater 322 by sidewalls 332, coupled to the back panel 122 in a substantially gas-tight fashion. The pilot heater extends lengthwise for a substantial portion of the housing, although portions are shown larger than in practice, to better illustrate the various components. Preferably, the pilot heater 322 occupies about 3% to 25% of the area of the housing 120, and most preferably between about 8% and 20%. According to one embodiment, the pilot heater 322 occupies about 10% of the area of the housing 120.

The pilot heater 322 includes a pilot supply port 330 and an electric heating element 334. The heating element 334 is contained entirely within the perimeter of the pilot heater 322. In operation, the pilot heater achieves light-off much more quickly and efficiently, because all the heat produced by the electric element 334 serves to heat only the portion of the catalyst layer 132 that operates with the pilot heater. While the electric heating element 334 is shown extending through much of the pilot heater 322, according to an alternative embodiment, the electric element 334 occupies only a very small portion of the pilot heater, and requires a relatively much smaller amount of power to reach an adequate activation temperature. Accordingly, when the pilot heater 322 is initially placed in operation, the electric heater 334 is energized to heat a small portion of the catalyst over the pilot heater 322 to the activation temperature, using a small battery supply, and that small portion begins catalytic combustion. Within a short time, as heat spreads from the small portion, the entire pilot heater comes into operation, and continues as described with reference to previous embodiments.

A fuel distribution header 324 is provided to more evenly distribute fuel to the heating element, and includes fuel ports 326 through which fuel is supplied from the distribution header to respective portions of the housing 120. The fuel distribution header 324 includes a fuel supply port 328 to which fuel is supplied from the heater control 335.

A thermoelectric device 336 is coupled to an outer surface of the back panel 122 opposite the pilot heater 322, and includes one or more thermoelectric modules 340 sandwiched between a first heat sink 341 and a second heat sink 342. The first heat sink 341 is coupled to the back panel 122 to provide a rigid mounting surface for the modules 340. When the catalytic heater element 320 is used in an enclosure like the cabinet 308 of FIGS. 12 and 13, an aperture 344 is preferably provided in the back panel 303 of the cabinet in a location that corresponds to the position of the thermoelectric device so that the second heat sink 342 extends through the aperture to the exterior of the cabinet.

Operation of thermoelectric devices are well known, and are commonly used to perform various functions, according to thermoelectric principles. For example, the Peltier effect refers to a phenomenon that occurs when an electrical potential is applied across a junction of two different conductive materials, in which heat is absorbed at one part of the circuit and released at another. This effect is often employed to cool microprocessors within a computer cabinet, by affixing a thermoelectric module similar to the modules 340 of FIG. 15 to the outer surface of a microprocessor, and coupling a heat sink to the opposite side of the panel, also as shown in FIG. 15. When a potential of the correct polarity is applied to the thermoelectric module, it transfers heat energy from the side in contact with the microprocessor to the opposite side. A heat sink is typically positioned on the opposite side, and carries the heat out to radiator fins where it can be dissipated by convection. According to another thermoelectric principle, if separate junctions of the circuit are placed at different temperatures, an electric current is generated, according to the Seebeck effect. The greater the temperature differential between the junctions, the stronger the electrical current. This is the principle of operation of the thermocouple 146 described with reference to FIGS. 4-7. A heat differential between the thermocouple probe and other portions of the circuit produce a small electric current that controls the shut-off valve 162, so that if the pilot heater 140 goes out, the current stops and the valve closes.

In the present embodiment, the thermoelectric device 336 is positioned on the back panel 321 of the housing 120, opposite the pilot heater 322. However, rather than operating the thermoelectric modules 340 as Peltier devices, to transfer heat from one location to another, as is typical with such devices, they are operated as Seebeck devices, to generate electricity to power the control circuit, using waste heat produced by the pilot heater 322. Because Seebeck operation relies on a temperature differential, it is important that the second heat sink 342 be cooled as efficiently as possible, so that the outer face of the thermoelectric moduled 336 are cooler than the opposite face, in contact with the first heat sink 341. Cooling of the heat sink 342 is generally greatly enhanced by extending the heat sink through the aperture 344 out of the cabinet 308.

While the thermoelectric device 336, like the thermocouple, operates on the Seebeck principle, it provides a couple of advantages over the thermocouple. First, better safety and efficiency: an opening must be made in the back panel 122 of FIGS. 4-6 to permit the thermocouple to penetrate into the catalytic element 106. In contrast, the thermoelectric panel 340 is surface mounted to the back panel 321 housing 120, so the possibility of a gas leak at that location is eliminated. Second, higher power capacity: the thermocouple typically operates on a single junction between a copper tube that forms the probe of the device, and a wire that extends down the tube. The result is a relatively weak current, with a very low power capacity. In contrast, a thermoelectric panel can have dozens or hundreds of individual junctions, each producing a small current, so that collectively, a much more powerful current is produced, which affords the designer a wider choice of components to use in a control circuit. Furthermore, if additional power is required, additional thermoelectric devices can be added.

Figure 16:
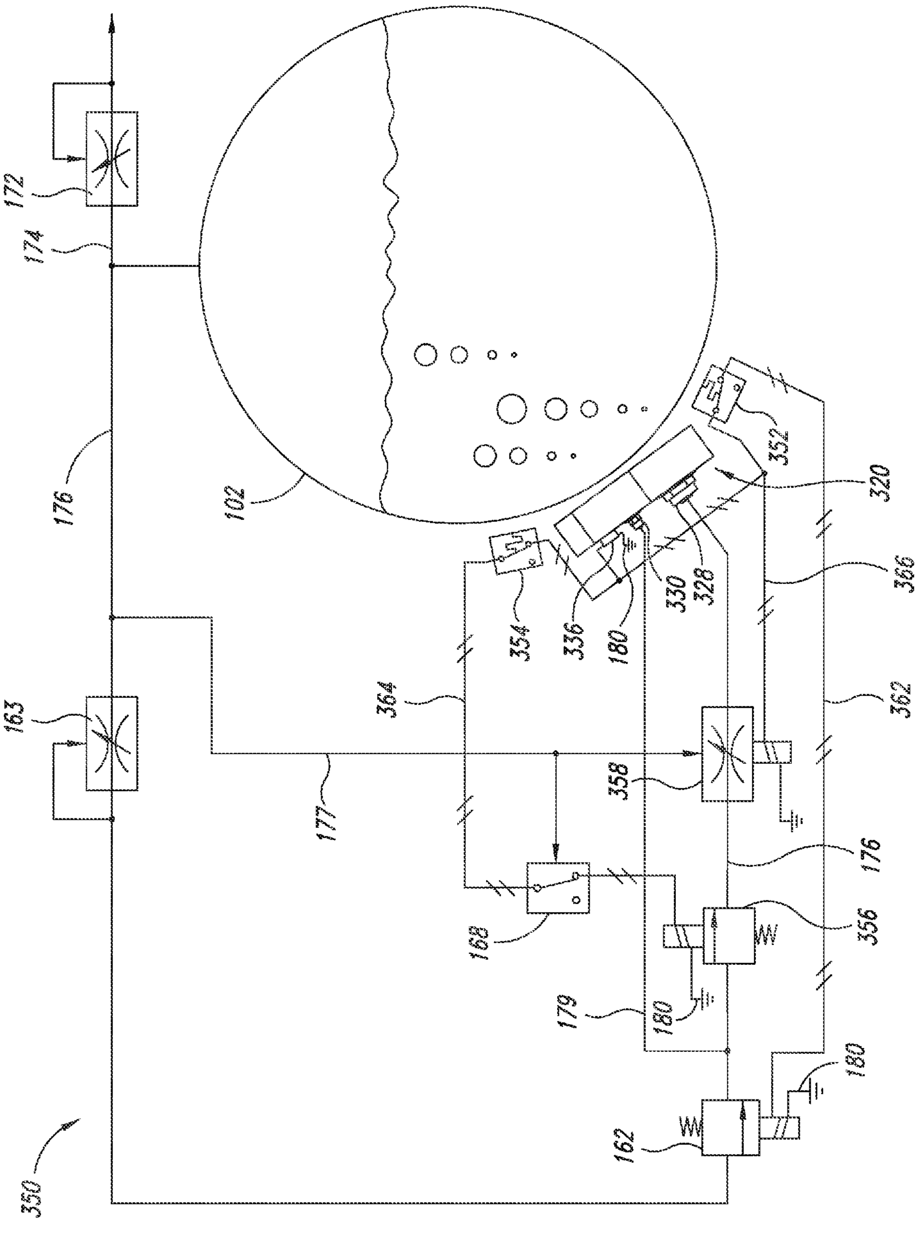
FIG. 16 is a schematic diagram of a catalytic tank heater control circuit according to an embodiment.

Turning now to FIG. 16, a heater control circuit 350 for operating the catalytic heater 320 is schematically illustrated, according to one embodiment. In addition to components previously described, the circuit 350 includes first and second tank wall temperature sensors 352, 354, a second shut-off valve 356, and a second regulator valve 358. The thermocouple device 336 of the catalytic element 320 is coupled to the shut-off valve 162 in series with the first tank wall temperature sensor 352 via a first electrical line 362. The thermocouple device 336 is coupled to the second shut-off valve 356 in series with the second tank wall temperature sensor 354, and the pressure switch 168 via a second electrical line 364. Finally, the thermocouple device 336 is coupled to the second regulator valve 358 via a third electrical line 366. Operation of the second regulator valve 358 is controlled by the pressure feedback signal at its control terminal, but the valve is powered electrically by the thermoelectric device 336.

All of the electrically operated functions are shown as being powered by the thermoelectric device 336. However, as mentioned above, in systems that require more power than is available from a single thermoelectric device, additional such devices can be added. The pilot heater 322 remains in operation continually, and its heat, especially the heat emanating from the back side of the catalytic element 320, is usually waste heat, so placing two or more thermoelectric devices has no appreciable impact on the system's operation.

During normal operation, the heater control circuit 350 operates much as described with reference to previous embodiments. The first regulator valve 163 regulates supply pressure to the system; pressure feedback line 177 provides direct tank pressure to control terminals of the pressure switch 168 and the second regulator valve 358, which regulates operation of the main heater of the catalytic heater element 320, to maintain tank pressure above a threshold; and the pilot heater 322 draws fuel via the pilot supply line 179 from a point between the shut-off valve 162 and the second regulator valve 358. These operations are discussed in more detail above.

The first tank wall temperature sensor 352 is positioned at a point that is below the heater element 320, and preferably near the bottom of the tank 102, and the second tank wall temperature sensor 354 is positioned near or above the uppermost portion of the heater element as described elsewhere.

In operation, when the liquid level inside the tank drops into the region where heat from the catalytic element 320 directly impinges on the tank wall, the wall heats up, because of the less efficient heat transfer. When the temperature of the tank wall exceeds a selected threshold, the switch of the second temperature sensor 354 opens, removing power to the second shut-off valve 356, which closes, shutting off fuel to the main heater. However, the pilot supply line 179 is coupled to the fuel supply line upstream from the second shut-off valve 356, in contrast to the embodiment of FIG. 7, and so is not controlled by this action. Thus, the pilot heater 322 remains in operation when the main heater is shut-down. Accordingly, when the tank temperature drops again, the main heater can relight, to continue operation.

This operation continues until the tank level drops to below the first tank wall temperature sensor 352, positioned near the bottom of the tank. This portion of the tank wall will not begin heating until the tank is nearly or completely empty. Accordingly, when the first sensor reaches its threshold, it shuts of power to the shut-off valve 162, which is upstream from the pilot heater as well as the main heater. Therefore, when the shut-off valve 162 closes, the entire heater system shuts down, so that it cannot return to operation until it is manually relighted.

Figure 17:
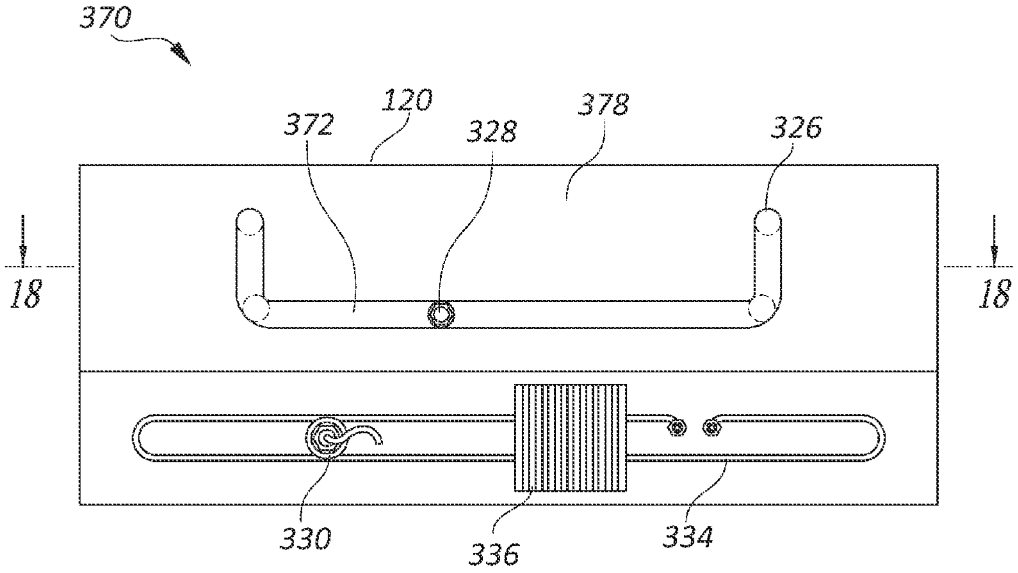
FIG. 17 is a diagrammatic view of a catalytic heater according to an embodiment, showing configurations and positions of various features as viewed from the back of the device.
Figure 18:
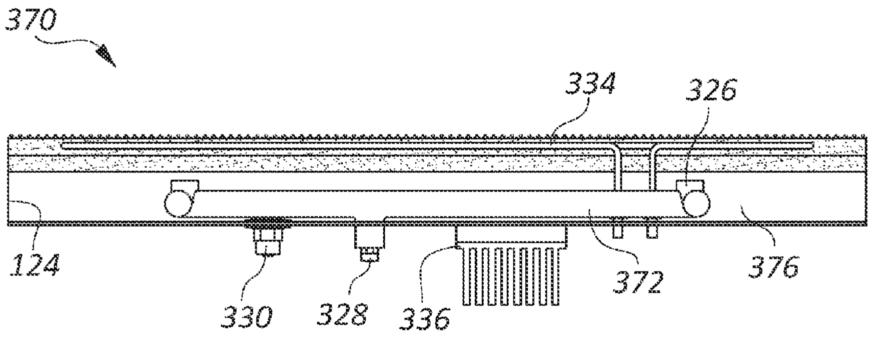
FIG. 18 is a diagrammatic view of the heater of FIG. 17 showing configurations and positions of various features, the view taken from a side of the device along lines 18-18 of FIG. 17.

FIGS. 17 and 18 show a catalytic heater element 370, according to another embodiment, in diagrammatic views that substantially correspond to the views of the element 106 of FIGS. 4 and 5. FIG. 17 shows the element 370 in a bottom plan view, and FIG. 18 is a side view of the catalytic heater element 370 of FIG. 17, taken along lines 18-18. Many features that are not essential to an understanding of the embodiment are omitted for simplicity.

Features that distinguish the catalytic element 370 from elements of previously disclosed embodiments include a fuel distribution header 372 and a pilot heater 374. In particular, the pilot heater is positioned at the bottom of the housing 120, as viewed in FIG. 17. When the catalytic element 370 is mounted to an LPG storage tank, the pilot heater is positioned below the main heater 378 and extends substantially the full width of the housing. When the main heater is engaged, all portions of the main heater can be warmed by the rising heat from the pilot element. Thus, total activation time is significantly shortened, as compared to other embodiments.

Additionally, the fuel distribution header 372 is positioned inside the housing 120, in the plenum chamber 376, rather than outside the housing, as described with respect to previous embodiments. While this may require a slight increase in the depth of the plenum chamber, relative to other embodiments, the overall dimensions of the heating element, including the header, are reduced. Additionally, with the distribution header 372 positioned inside the housing 120, clutter is reduced, as well as the number of apertures that are required to penetrate through the back of the housing, thereby also reducing the number of seals necessary, and improving safety and economy.

Figure 19:
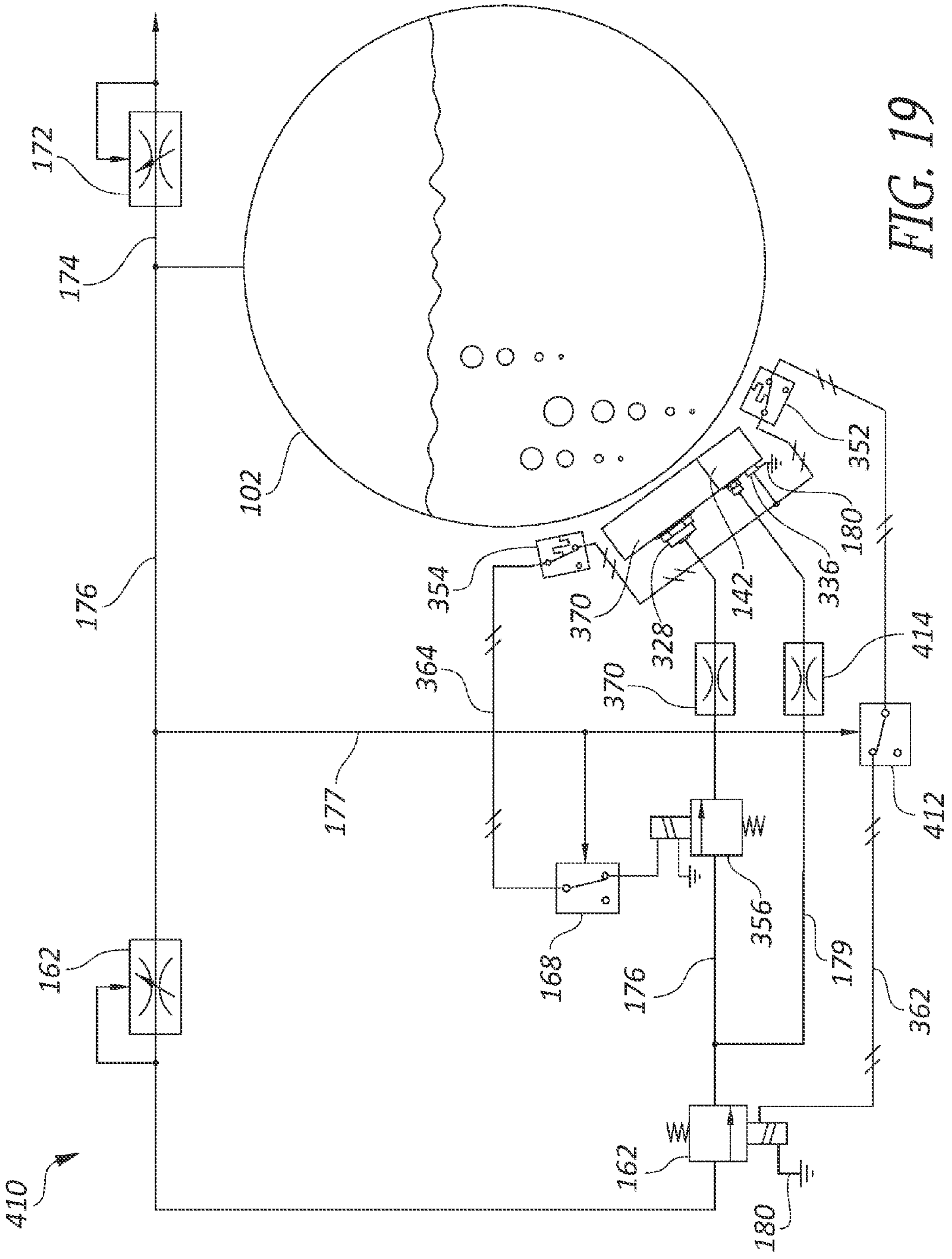
FIG. 19 is a schematic diagram of a heater control circuit according to an embodiment.

FIG. 19 is a schematic diagram of a heater control circuit 410 according to another embodiment. The circuit is shown to include the catalytic heating element 370 described with reference to FIGS. 17 and 18, but this is exemplary, only. Any appropriate heating element can be used with the circuit. The circuit of FIG. 19 is similar in structure and operation to the circuit of FIG. 16. Features that distinguish the circuit of FIG. 19 include a second pressure switch 412, and the absence of a second regulator valve.

In the circuit of FIG. 19, the first pressure switch 168 acts to control normal operation of the heating element 370. The first pressure switch 168 is set to close when tank pressure drops below a selected minimum tank pressure threshold, i.e., the turn-on threshold of the system. Because the regulator valve 163 is configured to maintain a fixed pressure in the supply line 176, and there is no other intervening regulator valve, the main element of the catalytic heater 370 always operates at the same output level, preferably near its maximum output level. The appropriate fuel volume can be controlled by providing an orifice 414 or its equivalent, to limit fuel flow, in combination with selecting the pressure maintained by the regulator valve 163.

The second pressure switch 412 is connected in series with the first tank wall temperature sensor 352 and the shut-off valve 162, and acts as an over-pressure shut-off. The switch is set to open if tank pressure rises above a selected maximum tank pressure threshold. When the second pressure switch opens, power is removed from the shut-off valve 162, which closes, thereby shutting off both the main and the pilot elements of the heater 370. As described above with reference to the circuit of FIG. 16, the first tank wall temperature sensor 352 is positioned to detect a rise in temperature indicating that the liquid in the tank is substantially exhausted. Thus, according to the embodiment of FIG. 19, a complete system shut down can be triggered either by excessive temperature, via temperature switch 352, or by excessive tank pressure, triggered by the second pressure switch 412.

Figure 20:
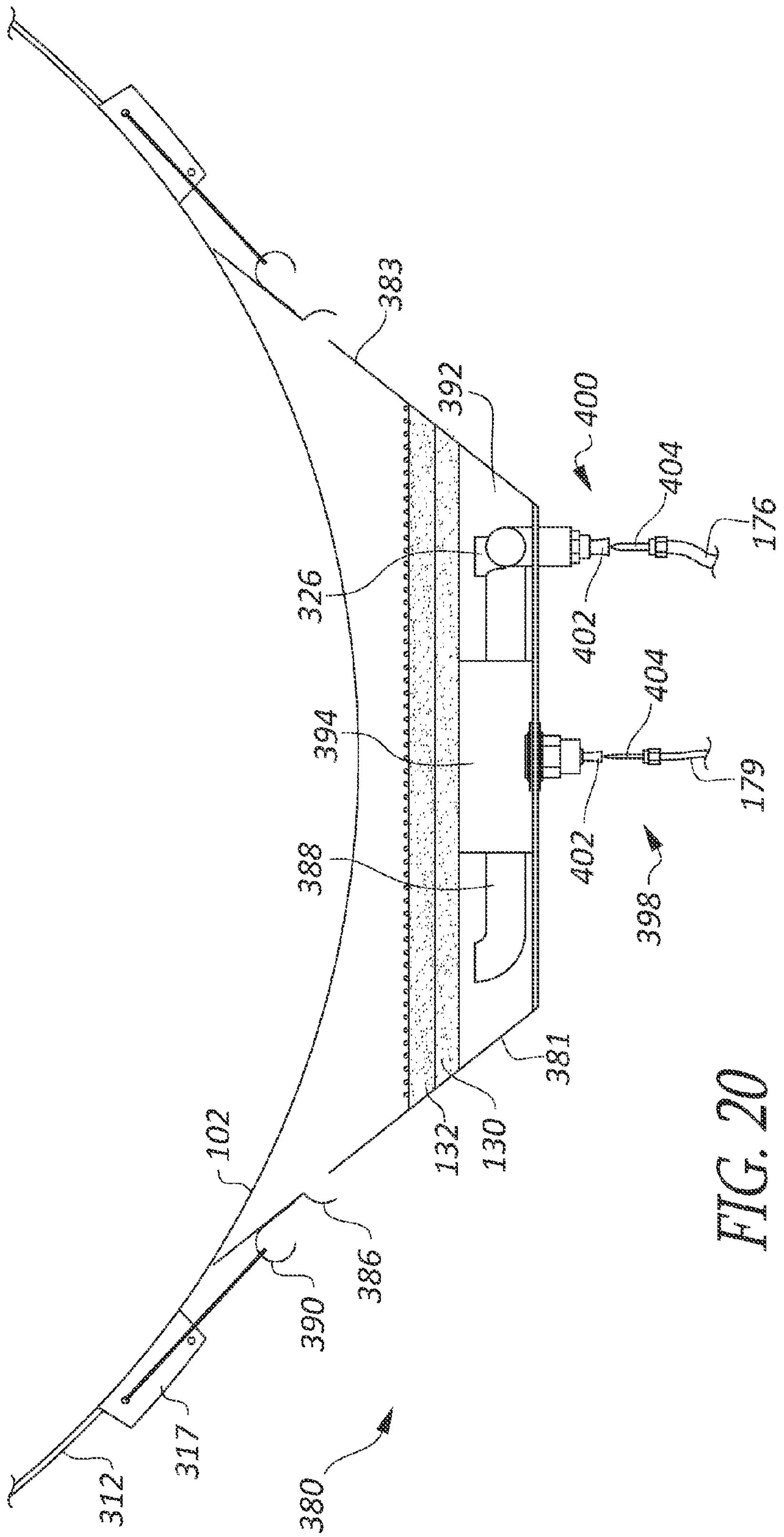
FIG. 20 is a diagrammatic view of a catalytic heater according to an embodiment, showing configurations and positions of various features as viewed from an end of the device.

Turning now to FIG. 20, a tank heater system 380 is shown in a side diagrammatic view, coupled to an LPG tank 102, according to another embodiment. The system 380 includes a catalytic heater element in a housing 381 that combines the functions of the housing of a heating element, as previously disclosed, and those of a cabinet or shroud, also as previously disclosed. In particular, the housing 381 includes sidewalls 383 that extend beyond the face of the catalyst layer 132 to contact the wall of the tank 102, enclosing a space between the catalyst layer and the tank wall for efficient transfer of heat from the element to the tank, without requiring a separate shroud.

Connectors 390 are provided near the outer edges of the sidewalls 383 for coupling the tank heater system 380 to the tank 102. In the illustrated embodiment, the connectors 390 are shown as hooks, which are engaged by toggle buckles 317 substantially as described with reference to the connectors 319 of the embodiment of FIG. 13.

The tank heater system 380 is shown positioned at the bottom of the tank 102, so that the face of the catalyst layer 132 is lying in a horizontal plane. In a typical catalytic heating element, such an orientation will permit combustion only around the perimeter of the heating element, as heated gas rising from the perimeter prevents oxygen from reaching much of the catalyst layer inside the perimeter. However, according to the embodiment of FIG. 20, a fuel supply port 400 and a pilot supply port 398 are each provided with venturi-type fuel inlets 402 and nozzles 404. Thus, for example, as fuel passes from the fuel supply line 176 through the nozzle 404 and into the inlet 402 of the fuel supply port 400, the flow of gas is accelerated by a reduced aperture of the venturi nozzle. The accelerated gas flow entrains air in the vicinity, which is drawn with the fuel into the inlet 402. The mixture passes from the inlet 402 to a distribution header 388 and thence to a plenum chamber 392. A pilot element 394 is similarly supported by the pilot supply port 398.

The relative sizes of the apertures of the nozzles 404 and the inlets 402 are selected to admit an appropriate volume of fuel to operate the catalytic element, and to entrain a volume of air sufficient to provide the oxygen necessary for its operation. Because the necessary oxygen is premixed with the fuel, there is no requirement for air flow across the face of the catalytic element. The sidewalls 383 are provided with exhaust vents 386 to permit the escape of exhaust gas from the housing 381.

A particular advantage of the embodiment of FIG. 20 is that it can be mounted at the bottom of the tank. This permits heating of the tank wall at a location where liquefied gas is present until the tank is completely empty. This is in contrast to other embodiments, in which heating elements are mounted to the side of a tank, so that the liquid in the tank can drop below a level of the element, reducing heat transfer efficiency.

It should be noted that the tank heating system 380 of FIG. 20 is not limited to the position or angle shown, but can be mounted at any angle. Additionally, more than one tank heating system can be mounted to a single tank, especially where the tank capacity is very large, relative to the heat output of a single heating system.

Figure 21:
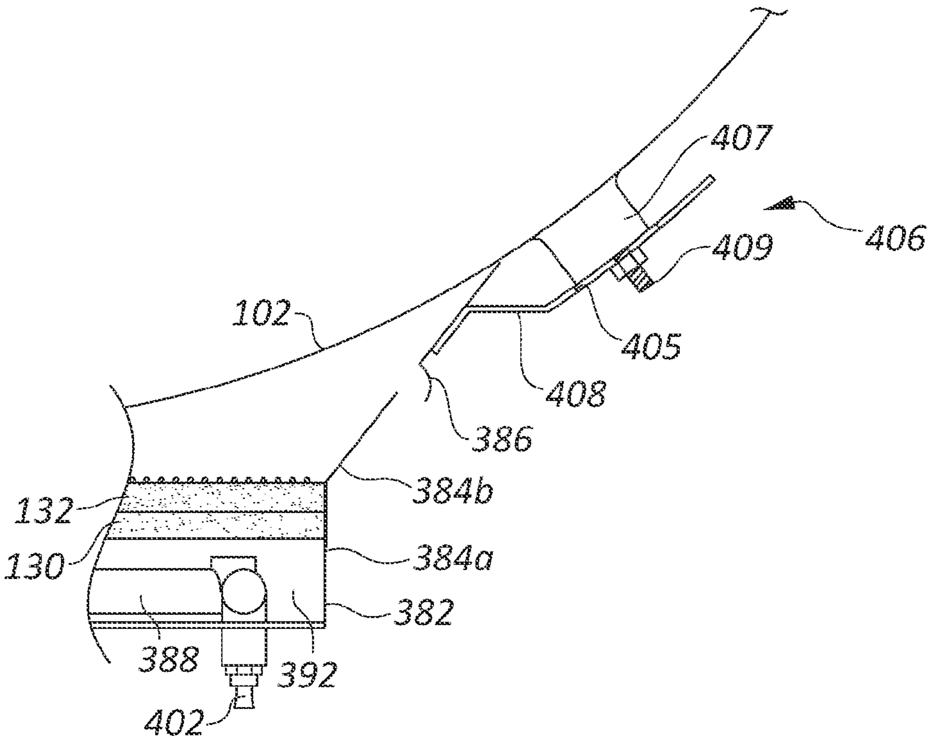
FIG. 21 is a detail of a tank heater system in a diagrammatic end view according to an embodiment.

FIG. 21 is a detail of a tank heater system in a diagrammatic end view, according to an embodiment, showing alternative configurations of features disclosed with reference to previous embodiments. The embodiment of FIG. 20 is shown with a housing 381 with sidewalls 383 that extend, as viewed in the drawing, in substantially straight lines from the back of the housing to the front edges that contact the tank 102. In the embodiment of FIG. 21, a housing 382 includes first sidewall portions 384*a* that extend from the back of the housing substantially perpendicular to the back as far as the front of the catalytic layer 132. Second sidewall portions 384*b* are coupled to the first sidewall portions 384*a* and extend forward at an angle until they contact the wall of the tank 102. One advantage of this configuration, is that it permits the use of commercially available catalytic heating elements, which are generally rectangular in shape, and to which the second portions 384*b* of the sidewalls are coupled for operation as described with reference to the embodiment of FIG. 20.

Also shown in FIG. 21 is an alternative mounting structure 406 for mounting a catalytic heater to an LPG tank. The mounting structure 406 includes a mounting post 407 welded or otherwise coupled to the wall of the tank 102. The mounting post 407 includes a threaded rod 409 that extends therefrom. A mounting bracket 408 that includes an aperture 405 is coupled to the catalytic heater. The heater is positioned so that the threaded rod 409 extends through the aperture 405 and is fixed in place by a nut threaded onto the bolt 409. A catalytic heater may employ four or more such mounting structures to securely couple the heater to the tank.

The mounting structure 406 can be used as an alternative to the various structures that employ straps around the tank 102, as disclosed with reference to other embodiments.

In the embodiment shown, the aperture 405 is in the form of an elongated slot that permits some adjustment of the angle of the heater around a longitudinal axis of the tank 102. This is particularly useful when the mounting bracket is used to mount a heater that does not include venture-type inlet ports, and that therefore requires a flow of air across the face of the catalytic layer. The slot 405 in the bracket 408 permits angular adjustment of the heater, upward to improve airflow, or downward to apply heat closer to the bottom of the tank.

In embodiments that include a pilot heater, the size of the pilot heater relative to the total size of the catalytic element is a design consideration that will be influenced by a number of factors, including the overall size and output of the heating element, the expected frequency and duty cycle of operation of the system, the cost and availability of LPG fuel, etc. For example, a relatively larger pilot heater will consume more fuel than a smaller one, but will bring the main heater to full operation more quickly. During the activation period between the time fuel begins to enter the main heater and the time the main heater reaches full operation, some amount of fuel will flow through portions of the catalyst that have not yet reached the activation temperature, and will thus be wasted. If the system cycles on and off at a relatively high frequency, it may be more efficient to use a larger pilot heater so that the system reaches full operation more quickly and with less loss of unburned fuel. On the other hand, in a system that requires supplemental heat only infrequently, a small pilot heater may be preferable, so as to consume less fuel while the system is not in active operation.

In view of the difficulties associated with known systems for assisting in the vaporization of liquefied gas, the inventors have recognized that a catalytic tank heater can resolve many of the problems, and can provide additional benefits that are not available from prior art systems. First, a catalytic heating element operating on LPG gas cannot raise the temperature of LPG gas in its environment to the auto-ignition temperature of the gas, so there is no ignition or explosion danger in the event of a gas leak. The catalytic heater systems can meet or exceed the requirements for operation within a Class I, Division 1, Group D, hazardous location as governed by NFPA (National Fire Protection Agency) 58 and NEC (National Electrical Code) 70, and thus, in the U.S. can be used in close proximity to an LPG storage tank in any location where a storage tank is permitted. More expensive and complex systems can thus be eliminated, and the overall footprint of many LPG supply systems reduced by elimination of remotely located vaporizers and plumbing connections. Similarly, catalytic heaters can meet the requirements of equivalent regulations in many countries outside the U.S.

Because the catalytic heater element of the disclosed embodiments is not in physical contact with the tank, condensation is not trapped against the tank, but is permitted to evaporate, which substantially eliminates the corrosion problems associated with prior art tank heaters.

Many consumers of LPG are in locations that are remote from an electric grid, so any electric power must be generated at the site. The catalytic tank heater systems disclosed above do not require a regular source of electric power. Once the pilot heater is operating, no external power source is required, and the pilot heater can be started in a few minutes using a generator, a car battery, or even a smaller battery, depending on the configuration of the system.

In most jurisdictions, where permanent electrical connections are necessary within a specified distance from an LPG storage tank, those connections must be installed and serviced by electricians who are certified to perform the work, because of the potential dangers that could arise if the work is done improperly. Similarly, work that entails servicing or modifying gas connections within the same distance must be done by personnel who are certified to perform that work. This means that with prior art systems that employ an electric tank heater or vaporizer, installation and maintenance generally requires the services of at least two people: one to perform the electrical work, and another to perform the work on the gas equipment. In contrast, systems configured according to many of the present embodiments can be installed and serviced by one individual, because there are no permanent electrical connections required.

The term psi is commonly understood as referring, broadly, to pounds per square inch, but technically defines pounds per square inch relative to a vacuum. Where psi is used in the present specification or claims, it is to be understood as referring, more specifically, to psig, or psi gauge, which defines the pressure being measured relative to the ambient pressure, rather than to a vacuum.

In describing the embodiments illustrated in the drawings, directional references, such as right, left, top, bottom, above, below, etc., are used to refer to elements or movements as they are shown in the figures. Such terms are used to simplify the description and are not to be construed as limiting the claims in any way.

Where front and back are used in the specification and claims with reference to catalytic heater elements and associated features, front refers to the face of the element where the catalyst is located, and from which most of the heat is radiated when a fuel is catalyzed. Back, therefore, refers to the surface of the element opposite the front. In this context, front and face are used synonymously. Sidewall refers to the portions of a catalytic heater element housing that extend from the back of the element toward the front, and that define the perimeter of the element or portion of the element, as viewed in front or back plan view. The claims are not limited by the use of these terms in the specification to describe the disclosed embodiments.

A feature described as being gas-tight is one that will generally not permit passage of gas at that location at the pressure range that the described feature would be expected to be normally subjected to. For example, during operation, the gas pressure in the plenum chamber of a catalytic heater is normally equal to, or only slightly above ambient pressure, so where the sides and back panel of a housing of a heater element are described as being gas-tight, those features need only be capable of substantially preventing passage of gas at slightly above the ambient pressure. Thus, unnecessary gaps or openings or loose joints where gas could easily pass are not present, but special seals, hermetic sealing materials, or joints, such as would be necessary at higher pressure differentials are not generally required.

Ordinal numbers, e.g., first, second, third, etc., are used according to conventional claim practice, i.e., for the purpose of clearly distinguishing between claimed elements or features thereof. The use of such numbers does not suggest any other relationship, e.g., order of operation or relative position of such elements, nor does it exclude the possible combination of the listed elements into a single component, structure, or housing. Furthermore, ordinal numbers used in the claims have no specific correspondence to ordinal numbers used in the specification to refer to elements of disclosed embodiments on which those claims might read.

Where a claim limitation recites a structure as an object of the limitation, that structure itself is not an element of the claim, but is a modifier of the subject of the limitation. For example, in a limitation that recites "a shroud configured to conform to the wall of a cylindrical tank," the cylindrical tank is not an element of the claim, but instead serves to define the scope of the term shroud. Additionally, subsequent limitations or claims that recite or characterize additional elements relative to the tank do not render the tank an element of the claim, except where the tank is recited as the subject of the limitation, rather than an object.

The term coupled, as used in the claims, includes within its scope indirect coupling, such as when two elements are coupled with one or more intervening elements, even where no intervening elements are recited. Coupled can also refer to a direct coupling, in which elements are directly coupled or are formed from a same piece of material so as to be monolithic or integral.

The abstract of the present disclosure is provided as a brief outline of some of the principles of the invention according to one embodiment, and is not intended as a complete or definitive description of any embodiment thereof, nor should it be relied upon to define terms used in the specification or claims. The abstract does not limit the scope of the claims.

Features of the various embodiments described above are generally disclosed with reference to particular embodiments as a matter of convenience. Individual features of one embodiment can be omitted, exchanged with corresponding features of another embodiment, or otherwise combined therewith, and further modifications can be made, to provide further embodiments, without deviating from the spirit and scope of the invention. All of the commercial devices and structures referred to in this specification, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification, but should be construed to include all possible embodiments along with the full scope of equivalents to which such claims are entitled. Accordingly, the claims are not limited by the disclosure.

The invention claimed is:

1. A catalytic tank heater for heating fuel gas stored under pressure as a liquid in a storage tank, the catalytic tank heater comprising:

a catalytic heater element;

a mounting arrangement coupled to the catalytic heater element to space the catalytic heater element away from an exterior surface of the storage tank at a distance to permit passage of air between the catalytic heater element and the storage tank, yet sufficiently close that substantially any heat radiated outward from a face of the heater element impinges on the exterior surface of the storage tank, the mounting arrangement including a housing having a substantially open face, a back panel and sidewalls;

an open space between the catalytic heater element and the back panel defining a plenum chamber;

a main fuel inlet traversing the back panel and configured to deliver fuel to the plenum chamber;

a pilot heater positioned entirely within the housing, defined and enclosed by pilot sidewalls extending from the back panel toward the open face of the housing at least a depth of the plenum chamber, the back panel and the pilot sidewalls being substantially gas-tight, and including a portion of the plenum chamber as a pilot plenum chamber, and configured to deliver fuel to a portion of the catalytic heater element positioned in front of the pilot heater; and a pilot fuel inlet traversing the back panel and configured to deliver fuel to the pilot plenum chamber.

2. The catalytic tank heater of claim 1, further comprising:

a heat sensor coupled to the housing in a position to detect heat produced by combustion in the pilot heater.

3. The catalytic tank heater of claim 2 wherein the heat sensor includes a thermocouple traversing the back panel and extending within the pilot heater substantially normal to the back panel toward the catalytic heater element.

4. The catalytic tank heater of claim 2 wherein the heat sensor includes a substantially planar thermoelectric device coupled to a surface of the back panel on a side opposite the plenum chamber and in a position that corresponds to a position of the pilot heater.

5. The catalytic tank heater of claim 2, further comprising:

a fuel line coupled at a first end to the main fuel inlet and configured to deliver fuel to the main fuel inlet;

a shut-off valve positioned in the fuel line and operatively coupled to the heat sensor, and configured to close if the heat sensor does not detect heat produced by combustion within the pilot heater;

a control valve positioned in the fuel line between the shut-off valve and the main fuel inlet and including a control terminal, configured to control a flow of fuel in the fuel line according to a control signal at the control terminal; and a pilot fuel line coupled at a first end to the fuel line between the shut-off valve and the control valve and at a second end to the pilot fuel inlet, and configured to deliver fuel from the fuel line to the pilot fuel inlet.

6. The catalytic tank heater of claim 5 wherein the control valve is a regulator valve configured to regulate a volume of fuel passing through the regulator valve to the main fuel inlet.

7. The catalytic tank heater of claim 6 wherein the control signal corresponds to a pressure value in the fuel line between the shutoff valve and a second end of the fuel line, the regulator valve being configured to regulate the flow of fuel so that the volume of fuel passing through the regulator valve is inversely related to the pressure value.

8. The catalytic tank heater of claim 5 wherein the control signal corresponds to a pressure value in the fuel line between the shutoff valve and a second end of the fuel line, the control valve being configured to admit fuel to the main fuel inlet while the pressure value is below a threshold.

9. The catalytic tank heater of claim 5, further comprising:

a pressure sensor coupled to the fuel line to detect a pressure value in the fuel line between the shutoff valve and a second end of the fuel line, the shut-off valve being configured to close the fuel line if the pressure value exceeds a threshold.

10. The catalytic tank heater of claim 5 wherein the heat sensor includes a thermoelectric element coupled to a back side of the housing opposite the pilot heater and configured to produce an electrical potential while a heat differential is present across the thermoelectric element, and wherein operation of one or more of the shut-off valve and the control valve is powered by the electrical potential produced by the thermoelectric element.

11. The catalytic tank heater of claim 5, further comprising:

an additional temperature sensor positioned separate from the housing and operatively coupled to one or more of the shut-off valve and the control valve, the one or more valves operatively coupled thereto being configured to close if the additional temperature sensor detects a temperature exceeding a threshold.

12. The catalytic tank heater of claim 1, further comprising:

an electric heater element positioned entirely within a perimeter defined by the pilot sidewalls, and configured to raise a temperature of the catalytic heater element within the perimeter defined by the pilot sidewalls.

13. The catalytic tank heater of claim 1 wherein the catalytic heater element is adjustably coupled to the mounting arrangement for adjustment of a distance between a face of the catalytic heater element and the storage tank.

14. The catalytic tank heater of claim 1 wherein the mounting arrangement comprises a shroud that extends around at least a portion of the catalytic heater element and that conforms to a contour of the storage tank.

15. A catalytic tank heater for heating fuel gas stored under pressure as a liquid in a storage tank, the catalytic tank heater comprising:

a catalytic heater element; and a mounting arrangement coupled to the catalytic heater element to space the catalytic heater element away from an exterior surface of the storage tank at a distance to permit passage of air between the catalytic heater element and the storage tank, yet sufficiently close that substantially any heat radiated outward from a face of the heater element impinges on the exterior surface of the storage tank, wherein the mounting arrangement comprises a shroud that extends around at least a portion of the catalytic heater element and that conforms to a contour of the storage tank, wherein the catalytic heater element includes a front face, a back panel lying in a plane substantially parallel to the front face, and sidewalls extending between the back panel and the front face, and wherein the shroud is coupled to the sidewalls and extends forward from the front face of the catalytic heater element.

16. The catalytic tank heater of claim 14 wherein the shroud includes first and second end walls, at least a portion of each being formed of an elastomeric material, the first and second end walls being configured to conform to the storage tank.

17. The catalytic tank heater of claim 14 wherein the shroud is in the form of a cabinet that substantially encloses the catalytic heating element against the storage tank.

18. A catalytic tank heater for heating fuel gas stored under pressure as a liquid in a storage tank, the catalytic tank heater comprising:

a catalytic heater element;

a mounting arrangement coupled to the catalytic heater element to space the catalytic heater element away from an exterior surface of the storage tank at a distance to permit passage of air between the catalytic heater element and the storage tank, yet sufficiently close that substantially any heat radiated outward from a face of the heater element impinges on the exterior surface of the storage tank, wherein the mounting arrangement comprises a shroud that extends around at least a portion of the catalytic heater element and that conforms to a contour of the storage tank, wherein the shroud is in the form of a cabinet that substantially encloses the catalytic heating element against the storage tank, and wherein the cabinet comprises:

an air inlet positioned to allow entry of air into the cabinet at a back side of the catalytic heater element; and an air outlet positioned to allow exit of air from the cabinet at a location close to the wall of the cylindrical structure and near an uppermost portion of the cabinet.

19. A catalytic tank heater for heating fuel gas stored under pressure as a liquid in a storage tank, the catalytic tank heater comprising:

a catalytic heater element;

a mounting arrangement coupled to the catalytic heater element to space the catalytic heater element away from an exterior surface of the storage tank at a distance to permit passage of air between the catalytic heater element and the storage tank, yet sufficiently close that substantially any heat radiated outward from a face of the heater element impinges on the exterior surface of the storage tank, wherein the mounting arrangement comprises a shroud that extends around at least a portion of the catalytic heater element and that conforms to a contour of the storage tank, wherein the shroud is in the form of a cabinet that substantially encloses the catalytic heating element against the storage tank, and wherein the cabinet further comprises a baffle positioned inside the cabinet extending between an uppermost part of the catalytic heater element and an interior surface of the cabinet, and substantially a length of the catalytic heater element.

20. A catalytic tank heater for heating fuel gas stored under pressure as a liquid in a storage tank, the catalytic tank heater comprising:

a catalytic heater element;

a mounting arrangement coupled to the catalytic heater element to space the catalytic heater element away from an exterior surface of the storage tank at a distance to permit passage of air between the catalytic heater element and the storage tank, yet sufficiently close that substantially any heat radiated outward from a face of the heater element impinges on the exterior surface of the storage tank, the mounting arrangement comprising a shroud in the form of a cabinet that conforms to a contour of the storage tank and substantially encloses the catalytic heating element against the storage tank;

first and second attachment features coupled to the cabinet along an upper edge thereof and configured to engage respective connectors of the storage tank, thereby holding the upper edge of the cabinet in close contact with the storage tank; and third and fourth attachment features coupled to the cabinet along a lower edge thereof and configured to engage respective connectors of the storage tank, thereby holding the lower edge of the cabinet in close contact with the storage tank.

21. A catalytic tank heater for heating fuel gas stored under pressure as a liquid in a storage tank, the catalytic tank heater comprising:

a catalytic heater element;

a mounting arrangement coupled to the catalytic heater element to space the catalytic heater element away from an exterior surface of the storage tank at a distance to permit passage of air between the catalytic heater element and the storage tank, yet sufficiently close that substantially any heat radiated outward from a face of the heater element impinges on the exterior surface of the storage tank, the mounting arrangement comprising a shroud in the form of a cabinet that conforms to a contour of the storage tank and substantially encloses the catalytic heating element against the storage tank;

a heater control mounted inside the cabinet and including a fuel input line coupled to a fuel inlet port of the catalytic heater element; and a regulator in the fuel input line, configured to regulate a flow rate of fuel to the fuel inlet port in inverse relation to a pressure level present at a control terminal of the regulator.

22. A system, comprising:

the catalytic tank heater of claim 1;

the storage tank; and a fuel supply line having a first end coupled to an outlet of a fuel supply, and a second end coupled to a main fuel inlet of the catalytic heater element.

23. The system of claim 22, further comprising:

a supply valve in the fuel supply line, having a control terminal coupled to receive a direct tank pressure and being configured to control a flow of fuel to the catalytic heater element according to a pressure level at the control terminal.

24. A system, comprising:

a storage tank storing fuel gas under pressure as a liquid;

a fuel supply line having a first end and a second end, the first end coupled to an outlet of a fuel supply;

a catalytic tank heater for heating the fuel gas stored in the storage tank, the catalytic tank heater comprising:

a catalytic heater element; and a mounting arrangement coupled to the catalytic heater element to space the catalytic heater element away from an exterior surface of the storage tank at a distance to permit passage of air between the catalytic heater element and the storage tank, yet sufficiently close that substantially any heat radiated outward from a face of the heater element impinges on the exterior surface of the storage tank, wherein the catalytic heater element is divided internally into a pilot heater and a main heater, each having a respective fuel supply inlet, and wherein the second end of the fuel supply line is coupled to the fuel supply inlet of the main heater, and wherein the system further comprises:

a supply valve in the fuel supply line, having a control terminal coupled to receive a direct tank pressure and being configured to control a flow of fuel to the catalytic heater element according to a pressure level at the control terminal;

a heat sensor positioned to detect heat produced by catalytic combustion in the pilot heater;

a shut-off valve in the fuel supply line between the first end of the fuel supply line and the supply valve and having a control terminal coupled to an output of the heat sensor, the shut-off valve configured to close if heat produced by catalytic combustion in the pilot heater drops below a pilot heat threshold; and a pilot supply line coupled at a first end to the fuel supply line between the shut-off valve and the supply valve, and at a second end to the fuel supply inlet of the pilot heater.

25. The system of claim 24, further comprising:

a second heat sensor coupled to the storage tank near the catalytic heater element.

26. The system of claim 25 wherein the control terminal of the shut-off valve is coupled to an output of the second heat sensor, the shut-off valve configured to close if a temperature of the wall of the storage tank rises above a tank temperature threshold.

27. The system of claim 26 wherein the second heat sensor is coupled to the wall of the storage tank in a position near a bottom of the storage tank, the system further comprising:

a third heat sensor, coupled to the wall of the storage tank at a height near an uppermost portion of the catalytic heater element; and a second shut-off valve in the fuel line between the pilot supply line and the regulator and having a control terminal coupled to an output of the third heat sensor, the second shut-off valve configured to close if a temperature of the wall of the storage tank rises above a second tank temperature threshold.

* * * * *